（12）United States Patent
Ban et al.

(10) Patent No.: US 11,050,683 B2
(45) Date of Patent: Jun. 29, 2021

(54) SYSTEM FOR PROVIDING DIALOG CONTENT

(71) Applicant: Samsung Electronics Co., Ltd, Suwon-si (KR)

(72) Inventors: Hyong Jin Ban, Suwon-si (KR); Yong Suk Kwon, Suwon-si (KR); Tae Sun Yeoum, Seoul (KR); Myeong Cheol Kim, Yongin-si (KR); Sung Jin Kim, Suwon-si (KR); Yoon Sung Nam, Yongin-si (KR); Pei Huang, Redmond, WA (US); Qia Wang, Kirkland, WA (US); Zhinan Zhou, Bellevue, WA (US)

(73) Assignee: Samsung Electronics Co., Ltd., Suwon-si (KR)

(*) Notice: Subject to any disclaimer, the term of this patent is extended or adjusted under 35 U.S.C. 154(b) by 352 days.

(21) Appl. No.: 15/953,179

(22) Filed: Apr. 13, 2018

(65) Prior Publication Data

US 2018/0302349 A1    Oct. 18, 2018

(30) Foreign Application Priority Data

Apr. 14, 2017    (KR) .................. 10-2017-0048452

(51) Int. Cl.
*H04L 12/58* (2006.01)
*H04L 29/06* (2006.01)
(Continued)

(52) U.S. Cl.
CPC ............. *H04L 51/02* (2013.01); *H04L 51/04* (2013.01); *H04L 69/08* (2013.01); *G06F 40/40* (2020.01);
(Continued)

(58) Field of Classification Search
USPC ........................................................ 709/206
See application file for complete search history.

(56) References Cited

U.S. PATENT DOCUMENTS 6,363,359 B1 *   3/2002   Gronemeyer ........ G06Q 10/087
                                                            705/26.8
6,446,046 B1    9/2002   Gronemeyer et al.
(Continued)

FOREIGN PATENT DOCUMENTS

CN    102177685 A    9/2011
CN    102420819 A    4/2012
(Continued)

OTHER PUBLICATIONS

Bailly, "Connecting mobile IMS services with Web Applications", Mobimedia 2009 Proceedings of the 5th Internatioanl ICST Mobile Multimedia Communicaitons Conference, Sep. 2009, pp. 1-5.*

(Continued)

*Primary Examiner* — Todd L Barker

(57) ABSTRACT

An electronic device is provided. The electronic device includes a housing, a display configured to be exposed through one surface of the housing, a communication module configured to communicate over a first network compliant with a first protocol or a second network compliant with a second protocol, a processor configured to be electrically connected with the display and the communication module, and a memory configured to be electrically connected with the processor and store a specified application. The memory stores instructions, that when executed, cause the processor 420 to execute the specified application, designate a CP server by interacting with a platform server over the second network, receive an initial response message generated by the designated CP server over the first network, and verify (Continued)

a first identifier of the designated CP server based on the first protocol from a source of the initial response message.

20 Claims, 18 Drawing Sheets

(51) Int. Cl.
    *H04W 88/06*     (2009.01)
    *H04L 29/08*     (2006.01)
    *G06F 40/40*     (2020.01)

(52) U.S. Cl.
    CPC .............. *H04L 51/36* (2013.01); *H04L 67/20* (2013.01); *H04W 88/06* (2013.01)

(56) References Cited

U.S. PATENT DOCUMENTS

| | | | |
|---|---|---|---|
| 7,426,563 | B2 | 9/2008 | Morita et al. |
| 7,555,683 | B2 | 6/2009 | Gronemeyer et al. |
| 8,645,565 | B2 | 2/2014 | Sparks et al. |
| 9,059,958 | B2 | 6/2015 | Wang |
| 9,277,522 | B2 | 3/2016 | Suryavanshi |
| 9,313,164 | B2 | 4/2016 | Suryavanshi |
| 9,397,936 | B2 * | 7/2016 | Cooper .................. H04L 45/72 |
| 9,565,615 | B2 | 2/2017 | Bharadwaj et al. |
| 9,571,611 | B2 | 2/2017 | Suryavanshi |
| 10,237,805 | B2 | 3/2019 | Carter et al. |
| 10,298,739 | B2 | 5/2019 | Lee et al. |
| 2004/0019685 | A1 * | 1/2004 | Morita ................ H04L 65/4084 709/227 |
| 2005/0204065 | A1 | 9/2005 | Son et al. |
| 2006/0133309 | A1 * | 6/2006 | Mathis .................. H04W 56/00 370/328 |
| 2013/0336337 | A1 * | 12/2013 | Gopinath ................ H04L 45/24 370/474 |
| 2014/0122619 | A1 * | 5/2014 | Duan ...................... G06F 40/20 709/206 |
| 2014/0372557 | A1 | 12/2014 | Buckley et al. |
| 2014/0379931 | A1 * | 12/2014 | Gaviria .................. H04L 67/02 709/227 |
| 2015/0055550 | A1 | 2/2015 | Suryavanshi |
| 2016/0219490 | A1 * | 7/2016 | Carter .................. H04W 40/02 |
| 2016/0227003 | A1 * | 8/2016 | Suryavanshi ....... H04L 65/1016 |
| 2016/0286027 | A1 | 9/2016 | Lee et al. |
| 2016/0352658 | A1 | 12/2016 | Capper et al. |
| 2017/0208462 | A1 * | 7/2017 | Zaifuddin ........... H04L 65/1096 |
| 2017/0357638 | A1 * | 12/2017 | Schlesinger ........ G06F 16/3344 |
| 2017/0374504 | A1 * | 12/2017 | Synal .................... H04W 4/021 |
| 2018/0032576 | A1 * | 2/2018 | Romero ............ G06F 16/24522 |
| 2018/0063675 | A1 * | 3/2018 | Raghav .................. H04W 4/12 |
| 2018/0146075 | A1 * | 5/2018 | Lee ......................... H04L 69/22 |

FOREIGN PATENT DOCUMENTS

| | | |
|---|---|---|
| CN | 103139703 A | 6/2013 |
| CN | 103401757 A | 11/2013 |
| CN | 103746897 A | 4/2014 |
| CN | 104396212 A | 3/2015 |
| CN | 105245433 A | 1/2016 |
| CN | 105340301 A | 2/2016 |
| CN | 105493468 A | 4/2016 |
| CN | 105812227 A | 7/2016 |
| CN | 105915448 A | 8/2016 |
| CN | 105991354 A | 10/2016 |
| EP | 2770757 A1 | 8/2014 |

OTHER PUBLICATIONS

Liberal, "European NG112 Crossroads: Toward a New Emergency Communications Framework", IEEE Communications Magazine, vol. 55, Issue: 1, Jan. 2017, IEEE Publishing, pp. 132-138.*
M. Mealling et al., "The Naming Authority Pointer (NAPTR) DNS Resource Record", Network Working Group, Sep. 1, 2000, 19 pages.
A.B. Roach, "SIP-Specific Event Notification", Internet Engineering Task Force (IETF), Jul. 10, 2012, 53 pages.
Communication pursuant to Article 94(3) EPC dated Jun. 4, 2019 in connection with European Patent Application No. 18 167 226.2, 11 pages.
European Patent Office, "Partial European Search Report," Application No. EP 18167226.2, dated Jun. 28, 2018, 20 pages.
Fujii, Haruhiko, et al., "SV-2FA: Two-Factor User Authentication with SMS and Voiceprint Challenge Response," The 8th International Conference for Internet Technology and Secured Transactions (ICITST-2013), IEEE, 2013, 5 pages. XP032572312.
Pogue, David, "iPhone: The Missing Manual, 3rd Edition," O'Reilly Media, Inc., Aug. 4, 2009, 16 pages. XP055109485.
Van Pelt, Tom, et al., Rich Communication Suite 7.0 Advanced Communications Services and Client Specification, Version 8.0, GSM Association, Official Document RCC.07, Jun. 28, 2017, 368 pages. XP055484161.
Office Action dated Jun. 24, 2020 in connection with Chinese Patent Application No. 201810337098.8, 14 pages.
Fujii et al., "SV-2FA: Two-Factor User Authentication with SMS and Voiceprint Challenge Response", The 8th Conference for Internet Technology and Secured Transactions, Dec. 9, 2013, 5 pages.
Notice of Allowance dated Mar. 9, 2021 in connection with Chinese Patent Application No. 201810337098.8, 11 pages.

* cited by examiner

SYSTEM FOR PROVIDING DIALOG CONTENT

CROSS-REFERENCE TO RELATED APPLICATION(S) AND CLAIM OF PRIORITY

This application is based on and claims priority under 35 U.S.C. § 119 to Korean Patent Application No. 10-2017-0048452 filed on Apr. 14, 2017, in the Korean Intellectual Property Office, the disclosure of which is incorporated by reference herein its entirety.

TECHNICAL FIELD

The present disclosure relates to a system for providing dialog content, an electronic device, and a server.

BACKGROUND

Recently, with the development of mobile communication technology, electronic devices have been transformed into a form capable of being easily carried and being freely accessed by wired and wireless networks. For example, a portable electronic device, such as a smartphone and a tablet personal computer (PC), may support various functions, such as Internet access and multimedia playback, in addition to call and message transmission and reception functions.

A user of an electronic device should be able to transmit a search keyword to a search engine to receive content or a service he or she wants. In a search using the search keyword, it is inconvenient for the user to directly derive a proper search keyword for himself or herself.

To address such an inconvenience, a dialog content providing service based on natural language understanding has been made. The purpose of the dialog content providing service is to analyze a meaning of a natural language request of the user and provide proper content to the user in a dialog manner.

The above information is presented as background information only to assist with an understanding of the present disclosure. No determination has been made, and no assertion is made, as to whether any of the above might be applicable as prior art with regard to the present disclosure.

SUMMARY

A dialog content providing service may be implemented based on a messenger application which provides a dialog user interface (UI). Representative over the top (OTT) based messenger applications have been developed by many developers and serve users from all over the world.

Thus, it can be difficult for a single content provider (CP) to develop software to fit each of various messenger applications to implement its dialog content providing service. In addition, since customers capable of receiving the dialog content providing service may be limited to users who install a messenger application, there may be a limitation in customer scalability.

Embodiments according to the present disclosure address at least the above-mentioned problems and/or disadvantages and provide at least the advantages described below. Accordingly, embodiments according to the present disclosure provide a system for providing dialog content to provide a single platform for a dialog content providing service, allow CP servers to depend on the platform, and communicate with an electronic device of a user over a network (e.g., a rich communication suite (RCS) network) with high scalability.

In accordance with embodiments of the present disclosure, an electronic device is provided. The electronic device may include a housing, a display configured to be exposed through one surface of the housing, a communication module configured to communicate over a first network compliant with a first protocol or a second network compliant with a second protocol, a processor configured to be electrically connected with the display and the communication module, and a memory configured to be electrically connected with the processor and store a specified application The memory may store instructions, when executed, causing the processor to execute the specified application, designate a content provider (CP) server by interacting with a platform server over the second network, receive an initial response message generated by the designated CP server over the first network, and verify a first identifier of the designated CP server based on the first protocol from a source of the initial response message.

In accordance with other embodiments of the present disclosure, a server is provided. The server may include a communication module configured to communicate with an electronic device over a first network compliant with a first protocol and communicate with a content provider (CP) server over a second network compliant with a second protocol, a processor configured with be electrically connected with the communication module, and a memory configured to be electrically connected with the processor and store a first correspondence relationship between a first identifier of the CP server based on the first protocol and a second identifier of the CP server based on the second protocol. The memory may store instructions, when executed, causing the processor to receive a first message formatted under the first protocol and destined to the first identifier of the CP server, from the electronic device over the first network, convert the first message to be formatted under the second protocol, change a destination of the converted first message to a second identifier of the CP server using the first correspondence relationship stored in the memory, and transmit the converted first message to the CP server indicated by the second identifier, over the second network.

In accordance with certain embodiments of the present disclosure, a server is provided. The server may include a communication module configured with communicate with an electronic device over a first network compliant with a first protocol and communicate with a CP server over a second network compliant with a second protocol, a processor configured with be electronically connected with the communication module, and a memory configured to be electrically connected with the processor and store a second correspondence relationship between an identifier of the electronic device based on the first protocol and a unique identifier allocated to the electronic device The memory may store instructions, when executed, causing the processor to receive a second message formatted under the second protocol and destined to the unique identifier allocated to the electronic device, from the CP server over the second network, convert the second message to be formatted under the first protocol, change a destination of the converted second message to the identifier of the electronic device based on the first protocol using the second correspondence relationship stored in the memory, and transmit the converted second message to the electronic device indicated by the identifier of the electronic device based on the first protocol, over the first network.

According to various embodiments disclosed in the present disclosure, message transmission and reception between a chatbot and an electronic device may be performed over an RCS network. A system according to various embodiments of the present disclosure may provide a more enhanced chatbot service due to enhanced scalability, accessibility, and compatibility of the RCS network. In addition, various effects directly or indirectly ascertained through the present disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
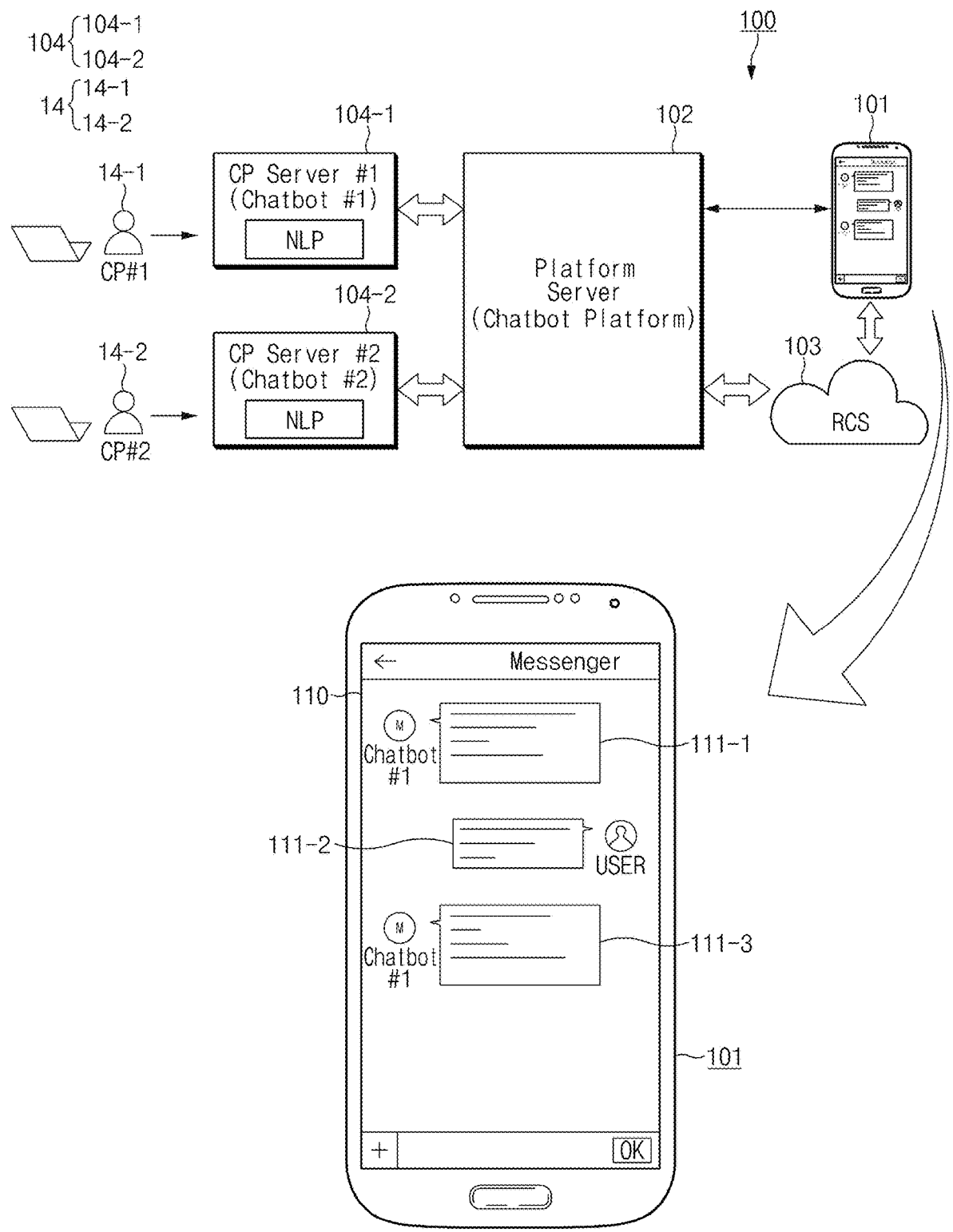
FIGS. 1A and 1B illustrate a system for providing dialog content according to various embodiments.

FIGS. 1A through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

An electronic device according to various embodiments of this disclosure may include various forms of devices. For example, the electronic device may include at least one of, for example, portable communication devices (e.g., smartphones), computer devices (e.g., personal digital assistants (PDAs), tablet personal computers (PCs), laptop PCs, desktop PCs, workstations, or servers), portable multimedia devices (e.g., electronic book readers or Motion Picture Experts Group (MPEG-1 or MPEG-2) Audio Layer 3 (MP3) players), portable medical devices (e.g., heartbeat measuring devices, blood glucose monitoring devices, blood pressure measuring devices, and body temperature measuring devices), cameras, or wearable devices. The wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, or electronic picture frames.

In certain embodiments, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), or internet of things (e.g., light bulbs, sprinkler devices, fire alarms, thermostats, or street lamps). The electronic device according to some embodiments of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

FIG. 1A illustrates a system for providing dialog content according to certain embodiments.

Referring to the non-limiting example of FIG. 1A, a system 100 for providing dialog content according to various embodiments may include an electronic device 101, a platform server 102, CP servers 104-1 and 104-2 (collectively called "104"). Although not illustrated, the electronic device 101, the platform server 102, and the CP servers 104-1 and 104-2 may be connected over, for example, a data network (an example of a second network) (e.g., an Internet protocol (IP) network or the Internet).

The electronic device 101 may include, but is not limited to, at least one of a portable communication device (e.g., a smartphone), a computer device (e.g., a personal digital assistant (PDA), a tablet personal computer (PC), a laptop PC, or a desktop PC), a portable multimedia device (e.g., an electronic book (e-book) reader or an MEPG-1 audio layer 3 (MP3) player), or a wearable device.

According to some embodiments, the electronic device 101 may access the platform server 102 over a data network (e.g., an IP network or the Internet). The electronic device 101 may access a webpage (a chatbot store webpage) operated by the platform server 102 through a browser or may execute a dedicated application (a chatbot store application). A user may search the CP server 104 which provides a service he or she wants through the webpage or the dedicated application and may subscribe to the found CP server 104.

According to certain embodiments, the electronic device 101 may communicate with the platform server 102 over a rich communication suite (RCS) network 103 and may transmit and receive a message with one of CP servers 104-1 and 104-2 through the medium of the platform server 102.

For example, the electronic device 101 may subscribe to the first CP server 104-1. A chat thread provided from a native messenger application may be initiated between the electronic device 101 and the first CP server 104-1 by the subscription. When the chat thread is initiated, the electronic device 101 and the first CP server 104-1 may transmit and receive messages 111-1, 111-2, and 111-3 with each other through a graphic user interface (GUI) 110 (e.g., a chat room) provided from the native messenger application. For example, the messages 111-1 and 111-3 generated by the first CP server 104-1 may be transmitted to the electronic device 101 over the RCS network 103. The message 111-2 generated by the electronic device 101 may be transmitted to the platform server 102 over the RCS network 103 to be converted in a specified manner and may then be transmitted to the first CP server 104-1.

The platform server 102 may play a role as a platform of the CP servers 104-1 and 104-2 and may serve as a medium between the CP servers 104-1 and 104-2 and the electronic device 101. For example, the platform server 102 may allow the electronic device 101 to search the CP servers 104-1 and 104-2 or may support to transmit and receive a message between the CP servers 104-1 and 104-2 and the electronic device 101.

According to various embodiments, the platform server 102 may communicate with the CP servers 104-1 and 104-2 over a data network and may communicate with the electronic device 101 over the RCS network 103. Thus, a message generated by each of the CP servers 104-1 and 104-2 should be converted into a message format based on the RCS network 103 by the platform server 102 to be transmitted to the electronic device 101. On the other hand, a message based on the RCS network 103, generated by the electronic device 101, should be converted into a message format based on the data network by the platform server 102 to be transmitted to the CP servers 104-1 and 104-2.

The RCS network 103 may be compliant with RCS (e.g., an example of a first protocol) which is an international standard protocol of a next-generation unified messaging service. RCS is an international standard protocol of the next-generation unified messaging service adopted by the global system for mobile communication association (GSMA) and may provide various features (e.g., a group chat, a file transfer, a state check of a recipient, a check of a message transmission state, or the like) which are not provided by a conventional messaging service (e.g., a short message service/multimedia message service (SMS/MMS)).

According to some embodiments, the RCS network 103 may be operated by a mobile network operator (MNO) and may specify subscribers (e.g., the electronic device 101 and the CP servers 104-1 and 104-2) based on a "phone number (e.g., a mobile station international subscriber directory number (MSISDN))".

A messaging service application program (hereinafter referred to as "messaging service application") using the RCS network 103 may be implemented as a native application, contrary to an OTT-based messaging service application (e.g., Facebook Messenger™, Line™ KAKAOTALK™, WHAT'S APP™, or the like). Thus, the user does not need to additionally download or install a separate messaging service application to use the RCS network 103. A messaging service application may be provided from the electronic device 101. Further, when the messaging service application using the RCS network 103 uses a "phone number" to specify a subscriber, the user does not need to sign up or sign in (or log in).

The CP servers 104-1 and 104-2 (collectively referred to as "104") may be respectively developed by, for example, CPs 14-1 and 14-2 (collectively referred to as "14"). The CP server 104 may provide an initial response message (e.g., a "welcome message") or a message associated with a service provided from the CP server 104 to the electronic device 101 through the platform server 102 and the RCS network 103.

According to certain embodiments, the CP server 104 may include a natural language processing (NLP) module (or a natural language understanding (NLU) module) which supports machine learning or artificial intelligence. The NLP module may derive a meaning or context of a natural language included in a message received from the electronic device 101 and may automatically generate a message corresponding to the meaning or context. In the present disclosure, the CP server 104 including the NLP module may be referred to as a chatbot or may be simply referred to as a bot.

Figure 1B:
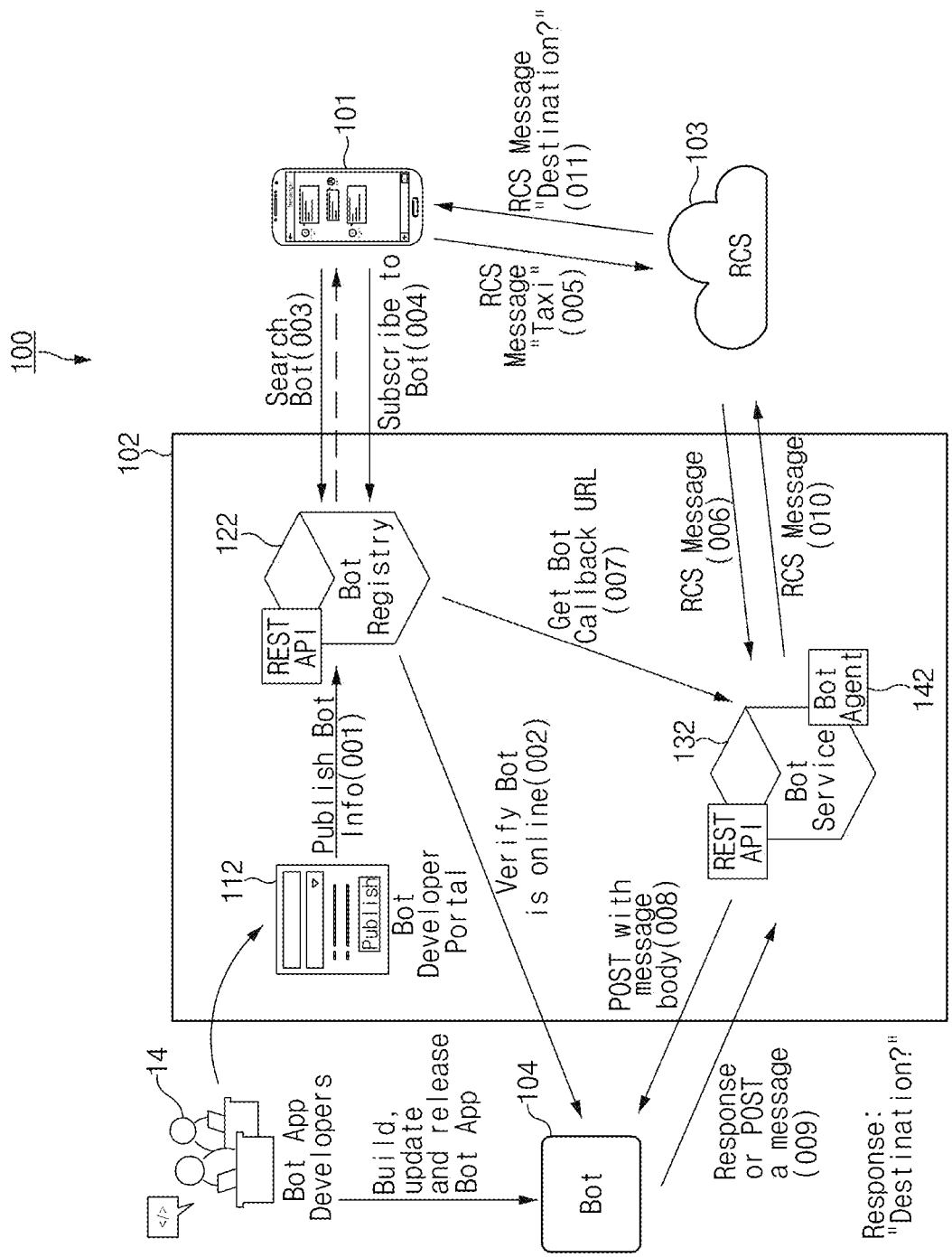

FIG. 1B illustrates a system for providing dialog content according to various embodiments.

Referring to FIG. 1B, a system 100 for providing dialog content according to some embodiments may include an electronic device 101, a platform server 102, and a chatbot 104. Although not illustrated, the electronic device 101, the platform server 102, and the chatbot 104 may be connected over, for example, a data network (an example of a second network) (e.g., an IP network or the Internet).

According to certain embodiments, a developer 14 may build, update, and release the chatbot 104. The developer 14 may access, for example, a developer portal webpage 112 of a chatbot store or the like and may register the chatbot 104.

In operation 001, the developer 14 may register information of the chatbot 104. For example, the developer 14 may access a developer portable webpage 112 of a "chatbot store" or the like and may register information such as a name, an icon, a description, and a uniform resource indicator (URI) of the chatbot 104.

According to various embodiments, in operation 001, the platform server 102 may generate an access token and may transmit the generated access token to the developer 14 and/or may receive a self-signed certificate from the developer 14. The token and the certificate may be used later to enhance security of a message transmitted and received between the platform server 102 and the chatbot 104.

In operation 002, the platform server 102 may verify the validity of the chatbot 104. For example, a BotRegistry 122 of the platform server 102 may verify whether the chatbot 104 is online to certify a registered URI.

In operation 003, the electronic device 101 may access a "chatbot store" operated by the platform server 102 through a specified application and may view chatbots registered with the BotRegistry 122 of the platform server 102. For example, the electronic device 101 may receive a list of chatbots registered with the BotRegistry 122 or may search or designate a chatbot which provides a service a user wants.

According to various embodiments, a format of a request message transmitted to the BotRegistry 122 of the platform server 102 by the electronic device 101 to search the chatbot 104 may include a header and a body. For example, the header and the body may be described like Tables 1 and 2 below, respectively.

TABLE 1

| Field | Type | Description |
|---|---|---|
| Content-Type | String | Content type of the request body: application/json |

TABLE 2

| Field | Type | Description |
|---|---|---|
| searchQuery optional | String | A search query for published bots. |
| pageNumber optional | String | A page index of search request. It begins with 1. |
| pageSize optional | String | A number of bot search result entry within single request. |

Further, a message including the result of searching the chatbot, provided to the electronic device 101 by the BotRegistry 122 of the platform server 102, may have a message format like Table 3 below. In Table 3, a list (botInfoList) of the found chatbots may include chatbot information (BotInfo) having a data format like Table 4 below.

TABLE 3

| Field | Type | Description |
|---|---|---|
| botInfoList | BotInfo[ ] | A list of bot search result. |
| searchTotalCount | int | Total number of the result. |

TABLE 4

| Field | Type | Description |
|---|---|---|
| appId optional | string | appId(BotId) value generated when the Bot was created in Bot Registry |
| name optional | string | A name of a Bot. |
| publisher optional | string | A publisher of a Bot. |
| msisdn optional | string | MSISDN of a Bot. |
| mno optional | string | Mobile Network Provider of a Bot. |
| iconUrl optional | string | A URL to a bot icon. |
| brief optional | string | A brief description of a Bot. |
| description optional | string | A detailed description of a Bot. |

In operation 004, the electronic device 101 may obtain an RCS identifier of the chatbot 104 and may subscribe to the chatbot 104 based on the RCS identifier. In this case, the chatbot 104 may obtain user information of the electronic device 101 via the platform server 102.

According to some embodiments, a message transmitted to the BotRegistry 122 of the platform server 102 by the electronic device 101 to subscribe to the chatbot 104 may be formatted to include a header and a body. For example, the header and the body may be described as shown in Tables 5 and 6 below.

TABLE 5

| Field | Type | Description |
|---|---|---|
| Content-Type | String | Content type of the request body: application/json |

TABLE 6

| Field | Type | Description |
|---|---|---|
| appId optional | String | appId(BotId) value generated when the Bot was created in Bot Registry |
| subscriberMsisdn optional | String | MSISDN of a subscriber. |
| subscriberName optional | String | A nick name of a subscriber. |
| code optional | String | A verification code retrieved from Bot Registry. |
| promotion optional | Boolean | If a subscriber subscribe for promotional messages. |

In operation 005, the electronic device 101 may start to chat with a chatbot (start a chat thread) over the RCS network 103. For example, the electronic device 101 may transmit a message ("Taxi") having a format under an RCS (e.g., a session initiation protocol (SIP) message format) and destined to an RCS identifier (e.g., an MSISDN) of the chatbot 104 to the RCS network 103.

In operation 006, a message generated by the electronic device 101 may be transmitted to a BotAgent 142 of the platform server 102 over the RCS network 103. The BotAgent 142 may be linked with the chatbot 104.

In operation 007, the BotService module 132 may convert a destination of the message, received in operation 006 by the BotAgent 142, in the form of a URI. For this purpose, the BotService module 132 may refer to a correspondence relationship between the RCS identifier of the chatbot 104, stored in the BotRegistry 122, and a URI of the chatbot 104.

In operation 008, the BotService module 132 may transmit a message to the chatbot 104 specified by the URI. The platform server 102 may establish a connection based on hypertext transfer protocol over secure socket layer (HTTPS) with the chatbot 104 to transmit the message. In this case, the platform server 102 may certify the chatbot 104 based on the certificate of the chatbot 104 registered in operation 001.

According to certain embodiments, a message transmitted to the chatbot 104 by the BotService module 132 of the platform server 102 in operation 008 may be formatted to include a header and a body. For example, the header and the body may be formatted as shown in Tables 7 and 8 below.

TABLE 7

| Field | Type | Description |
|---|---|---|
| Content-Type | String | Content type of the request body: application/json |

TABLE 8

| Field | Type | Description |
|---|---|---|
| messageType | String | "Message": Message from end users. |
| botID | String | AppID value generated when the Bot was created in Bot Registry. |

TABLE 8-continued

| Field | Type | Description |
|---|---|---|
| chatID | String | chatID of the chat this message belongs to. |
| message | Message | Actual message sent from the user. |
| contacts | Contacts | Contact information for the message. |

In operation 009, the chatbot 104 may generate a response message ("Destination?") to the message ("Taxi") and may transmit the generated message to the BotService module 132 of the platform server 102. According to various embodiments, the access token received in operation 001 may be included in some fields of the response message. The platform server 102 may certify whether the response message is generated and transmitted by an authorized chatbot using the token.

According to some embodiments, a message transmitted to the chatbot 104 by the BotService module 132 may be formatted to include a header, a parameter, and a body. For example, the header, the parameter, and the body may be formatted as shown in Tables 9 to 11 below.

TABLE 9

| Field | Type | Description |
|---|---|---|
| Authorization | String | Access token given by Bot Registry. |
| Content-Type | String | Content type of the request body: application/json |

TABLE 10

| Field | Type | Description |
|---|---|---|
| botID | String | BotID value generated when the Bot was created in Bot Registry. |

TABLE 11

| Field | Type | Description |
|---|---|---|
| chatID optional | String | chatID of the destination chat thread. |
| userID optional | String | userID of the recipient. Required only for unsolicited messages to a follower (i.e. when chatID is not available). |
| userNumber optional | String | Phone number of the recipient. Required only for unsolicited messages to a non-follower (i.e. when both chatID and userID is not available). |
| message | Message | Message to be sent to the user. |

In operation 010, the response message may be transmitted from the BotService module 132 to the BotAgent 142 to be converted into the format under the RCS (e.g., the SIP message format) by the BotAgent 142. The converted message may be transmitted to the RCS network 103.

In operation 011, the response message converted into the message may be transmitted to the electronic device 101 of the user over the RCS network 103.

Figure 2:
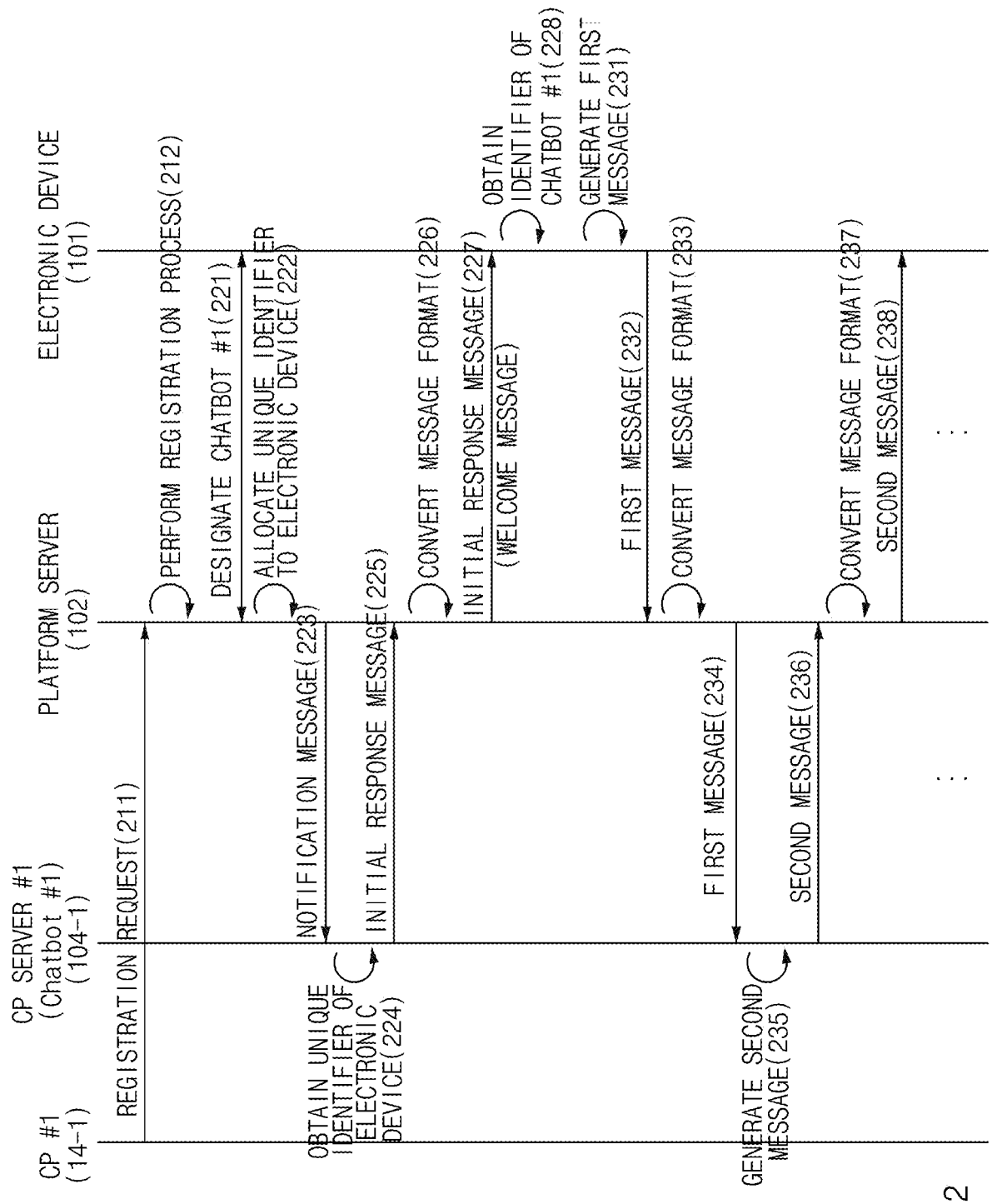
FIG. 2 illustrate operations of a method for providing dialog content according to some embodiments.

FIG. 2 illustrates operations a method for providing dialog content according to certain embodiments.

Referring to the non-limiting example of FIG. 2, the method for providing dialog content according to various embodiments may include operations 211 and 212 of registering a CP server, operations 221 to 228 of subscribing to the CP server, and chat operations 231 to 238. The operations illustrated in FIG. 2 may be performed by, for example, an electronic device 101, a platform server 102, and a first CP server 104-1 such as shown in FIG. 1A. Operations performed by each device may be implemented with instructions executable by a processor to be stored in a memory included in each device. Hereinafter, reference numerals of FIG. 1A may be used for a description of FIG. 2, and the first CP 104-1 may be referred to as a first chatbot 104-1.

In operation 211, a CP 14-1 (e.g., a developer of the first chatbot 104-1) may press a "chatbot generation" button on a webpage operated by a platform server 102. The CP 14-1 may provide information necessary to register the first chatbot 104-1 with a "chatbot store" to the platform server 102. For example, the CP 14-1 may transmit a registration request message including an identifier (e.g., a uniform resource identifier (URI)) on a data network of the first chatbot 104-1 to the platform server 102 using the first chatbot 104-1.

In operation S212, the platform server 102 may perform various processes for registering the first chatbot 104-1 with the "chatbot store". For example, the platform server 102 may allocate an identifier (e.g., an MSISDN) to be used in an RCS network 103 (an example of a first network) (hereinafter referred to as "RCS identifier") for the first chatbot 104-1. The platform server 102 may store a first correspondence relationship between an RCS identifier of the first chatbot 104-1 and an identifier (e.g., a URI) on a data network of the first chatbot 104-1 in its memory.

Further, in operation 212, the platform server 102 may authenticate the RCS network 103 or may configure various software modules (e.g., a BotAgent and a message queue described below) in the platform server 102 to be used for the first chatbot 104-1. For example, the platform server 102 may generate an access token and may transmit the generated access token to the first chatbot 104-1 and/or may receive a certificate (e.g., a self-signed certificate or a certificate issued by a certificate authority (CA)) from the first chatbot 104-1. The token and the certificate may be used to enhance security of a message.

In operation 221, an electronic device 101 of a user may designate the first chatbot 104-1 by interacting with the platform server 102 over a data network (an example of a second network).

For example, the electronic device 101 may execute a specified application (e.g., a native messaging service application, a web browser application, a market application, or the like). The electronic device 101 may access the "chatbot store" through the specified application and may view a status, availability, an abstract description, or the like of each of chatbots registered with the "chatbot store". The electronic device 101 may designate a specific chatbot (e.g., the first chatbot 104-1) among the chatbots registered with the "chatbot store". The specific chatbot (e.g., the first chatbot 104-1) may be designated using an RCS identifier of the specific chatbot.

According to some embodiments, when the first chatbot 104-1 is designated, the electronic device 101 may transmit a subscribe request and may initiate a session (e.g., chatroom generation or the like) for transmitting and receiving a message with the first chatbot 104-1 after being approved by the first chatbot 104-1. According to various embodiments, the electronic device 101 may request the user to perform user authentication to transmit the subscribe request. Further, when the user does not want to communicate with a specific chatbot, the electronic device 101 may transmit an unsubscribe request to the specific chatbot.

When the first chatbot 104-1 is designated by the electronic device 101, in operation 222, the platform server 102 may verify an RCS identifier of the electronic device 101.

The platform server 102 may allocate a unique identifier corresponding to the verified identifier of the electronic device 101 to the electronic device 101. A second correspondence relationship between the RCS identifier of the electronic device 101 and the unique identifier may be stored in a memory of the platform server 102.

According to certain embodiments, the RCS identifier of the electronic device 101 may be, but is not limited to, an MSISDN. According to various embodiments, the RCS identifier may be an international mobile station identity (IMSI) number. According to various embodiments, the unique identifier allocated to the electronic device 101 may indicate the electronic device 101 (UserID) or may indicate a message exchange thread (ChatID) to which the electronic device 101 belongs.

In operation 223, the platform server 102 may transmit a notification message to the first chatbot 104-1 over the data network. A destination of the notification message may be specified to a URI of the first chatbot 104-1, and the notification message may include the unique identifier of the electronic device 101, allocated in operation 222. The URI of the first chatbot 104-1 may be converted from an RCS identifier of a chatbot using the first correspondence relationship stored in the platform server 102 in operation 212.

According to some embodiments, the platform server 102 may establish a connection based on HTTPS with the first chatbot 104-1 to transmit the notification message. In this case, for example, the platform server 102 may certify the first chatbot 104-1 or a message transmitted and received with the first chatbot 104-1.

For example, when accessing the URI of the first chatbot 104-1, the platform server 102 may use an HTTPS protocol depending on the selection in operation 211 by the CP 14-1. The platform server 102 may verify whether a certificate transmitted upon a connection with the first chatbot 104-1 to avoid a man-in-the middle attack is issued by a CA based on a public key infrastructure (PKI). For another example, the platform server 102 may verify whether the same certificate as the self-signed certificate registered in operation 211 by the CP 14-1 is transmitted. For another example, the CP 14-1 may use an HTTP protocol and may use a symmetric key selectively provided in operation 221 by the platform server 102 to protect a message transmitted and received between the platform server 102 and the first chatbot 104-1.

In operation 224, the first chatbot 104-1 may verify or obtain the unique identifier of the electronic device 101 which wants to subscribe to the first chatbot 104-1 from the notification message received in operation 223.

In operation 225, the first chatbot 104-1 may generate an initial response message (or a welcome message) destined to the verified unique identifier of the electronic device 101 and may transmit the generated initial response message to the platform server 102 over the data network. In other words, the platform server 102 may receive the initial response message from the first chatbot 104-1 in response to transmitting the notification message.

According to certain embodiments, the initial response message may include an image, an audio, a video, a natural language text, a pre-defined UI (or a button), or the like. The pre-defined UI may directly include information corresponding to a popular query or may include an object indirectly connected (or linked) to the information. Receiving the initial response message, the user of the electronic device 101 may respond to the initial response message by selecting the pre-defined UI without directly typing a separate text.

According to various embodiments, the initial response message may include, for example, meta-information for describing a service provided from the CP server. The meta-information may at least in part include information for describing the chatbot itself, for example, a name, a category, an address, a service list, a publisher, or a description. The initial response message may be a message initially provided in response to subscription by the electronic device 101 and may be referred to as a "welcome message".

According to some embodiments, the access token received in operation 212 may be included in some fields of the initial response message. The platform server 102 may certify whether the initial response message is generated and transmitted by an authorized chatbot using the token. For example, the first chatbot 104-1 may use an HTTPs protocol to enhance security. The first chatbot 104-1 may include the access token provided from the platform server 102 in the initial response message. The platform server 102 may certify whether the received initial response message is a message transmitted from the first chatbot 104-1 registered in operation 212 by verifying the access token.

In operation 226, the platform server 102 may convert the initial response message received over the data network from the first chatbot 104-1 into a format under an RCS (e.g., an SIP message format). In this case, the platform server 102 may convert a destination of the initial response message from the unique identifier of the electronic device 101 to the RCS identifier of the electronic device 101. According to certain embodiments, in converting the destination of the initial response message, the platform server 102 may use the second correspondence relationship stored in the memory in operation 222.

In operation 227, the platform server 102 may transmit the initial response message converted in operation 226 to the electronic device 101 over the RCS network 103.

In operation 228, the electronic device 101 may verify or obtain an identifier of the first chatbot 104-1 based on the RCS (an RCS identifier, for example, an MSISDN) from a source of the initial response message received in operation 227. According to various embodiments, the electronic device 101 may obtain the RCS identifier of the first chatbot 104-1 in advance in operation 221. In this case, operation 228 may be omitted. For example, when the first chatbot 104-1 is a chatbot provided from a messaging service application, the RCS identifier of the first chatbot 104-1 may be obtained in advance.

In operation 231, the electronic device 101 may generate a message to be transmitted to the first chatbot 104-1 to use a service provided from the first chatbot 104-1. For example, the electronic device 101 may generate a first message formatted under the RCS and destined to the RCS identifier of the first chatbot 104-1.

According to various embodiments, the first message may have, for example, an SIP message format and may be referred to as a UserMessage in terms of being generated by the electronic device 101. The first message may be implemented by, for example, an RCS-based SMS/MMS. As another example, the first message may include a text, an image, an audio, a video, or the like including a natural language.

In operation 232, the electronic device 101 may transmit the first message generated in operation 231 to the platform server 102 over the RCS network 103. According to some embodiments, the first message may be formatted under the RCS and may be destined to the RCS identifier of the first chatbot 104-1.

In operation 233, the platform server 102 may convert the first message received over the RCS network 103 from the electronic device 101 into a format under a protocol applied to the data network (e.g., the Internet protocol). In this case, the platform server 102 may convert a destination of the first message from the RCS identifier of the first chatbot 104-1 to an identifier (e.g., a URI) on the data network of the first chatbot 104-1. According to certain embodiments, in converting the destination of the first message, the platform server 102 may use the first correspondence relationship stored in the memory in operation 212.

In operation 234, the platform server 102 may transmit the first message converted in operation 233 to the first chatbot 104-1 over the data network. According to various embodiments, the platform server 102 may establish a connection based on HTTPS with the first chatbot 104-1 to transmit the first message. In this case, the platform server 102 may certify the first chatbot 104-1 based on the certificate of the first chatbot 104-1, received in operation 212, (e.g., a certificate issued by a CA based on a PKI or a self-signed certificate) or may protect the first message through encryption based on a symmetric key.

In operation 235, the first chatbot 104-1 may generate a second message in response to receiving the first message. The second message may be associated with a context of the first message and may include content of a service provided from the first chatbot 104-1.

According to some embodiments, the second message may have, for example, a message format permitted by the data network. The second message may be destined to the unique identifier of the electronic device 101. According to various embodiments, the second message may be referred to as a BotMessage in terms of being generated by the first chatbot 104-1.

According to certain embodiments, the access token received in operation 212 may be included in some fields of the second message. The platform server 102 may certify whether the initial response message is generated and transmitted by an authorized chatbot using the token. For example, the first chatbot 104-1 may use the HTTPS protocol to enhance security. The first chatbot 104-1 may include the access token provided from the platform server 102 in the second message. The platform server 102 may certify whether the received second message is a message transmitted from the first chatbot 104-1 registered in operation 212 by verifying the access token.

According to various embodiments, the second message may include an image, an audio, a video, a natural language text, a pre-defined UI (e.g., a button), or the like. The pre-defined UI may directly include information corresponding to a popular query or may include an object indirectly connected (or linked) to the information. For example, when the first chatbot 104-1 is built by news media, the pre-defined UI may include a headline of news or may include a link of a news article having the headline. Receiving the second message, the user of the electronic device 101 may respond to the second message by selecting the pre-defined UI without directly typing a separate text.

According to some embodiments, the first chatbot 104-1 may include an NLP module associated with a service provided by the first chatbot 104-1. The first chatbot 104-1 may derive a meaning or context of the first message received from the electronic device 101 using the NLP module and may automatically generate the second message corresponding to the meaning or context. According to various embodiments, when the first chatbot 104-1 does not include the NLP module, it may derive a meaning or context of the first message received from the electronic device 101 by interacting with an external server comprising the NLP module.

In operation 236, the first chatbot 104-1 may transmit the second message destined to the unique identifier of the electronic device 101 to the platform server 102 over the data network.

In operation 237, the platform server 102 may convert the second message received in operation 236 into a format within the RCS (e.g., an SIP message format). In this case, the platform server 102 may convert a destination of the second message from the unique identifier of the electronic device 101 to the RCS identifier of the electronic device 101. According to certain embodiments, in converting the destination of the second message, the platform server 102 may use the second correspondence relationship stored in the memory in operation 222.

In operation 238, the platform server 102 may transmit the second message to the electronic device 101 over the RCS network 103. After operation 238, operations 231 to 238 may be repeatedly performed. According to various embodiments, the first chatbot 104-1 may receive two or more second messages as a response to the first message received from the electronic device 101.

In FIG. 2, at least one embodiment is exemplified as a chat (i.e., message transmission and reception) between the single chatbot 104-1 and the single electronic device 101. However, embodiments are not limited thereto. According to various embodiments, a group chat, such as a chat between a single electronic device and a plurality of bots, a chat between a plurality of electronic devices and a single bot, or a chat between the plurality of electronic devices and the plurality of bots, may be performed in a similar manner based on the operation shown in FIG. 2.

Figure 3A:
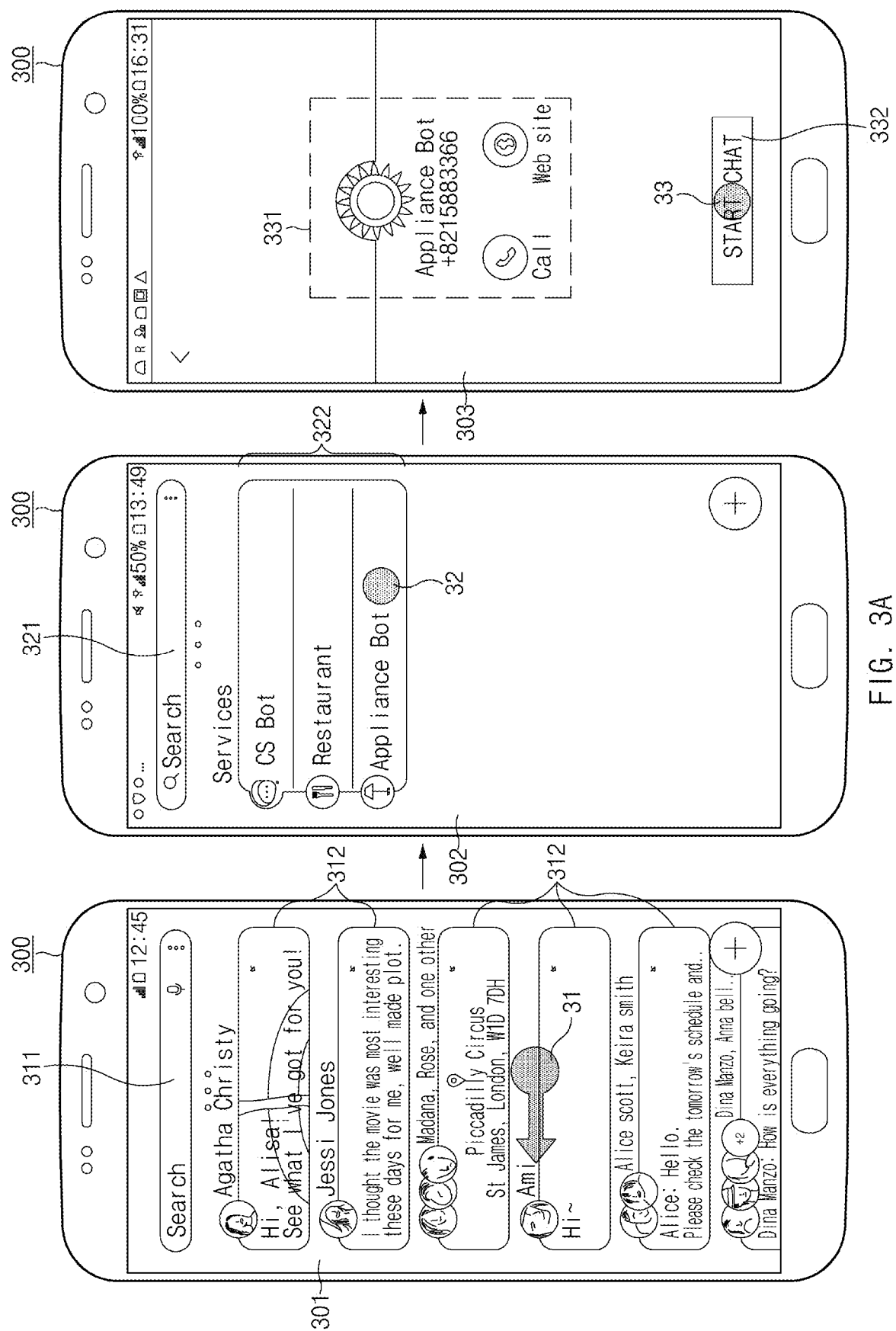
FIGS. 3A and 3B illustrate a graphic user interface (GUI) of an electronic device according to certain embodiments.
Figure 3B:
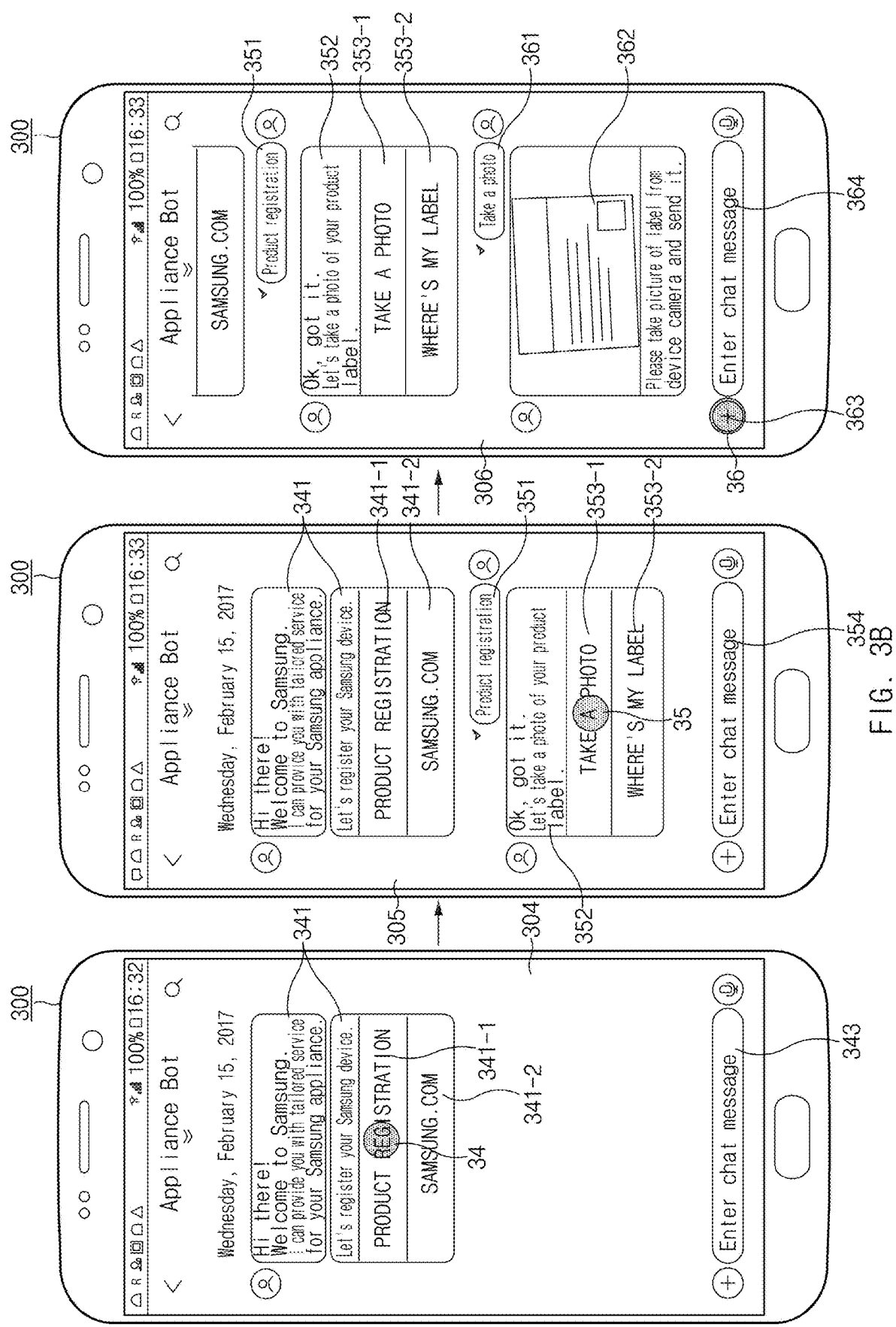

FIGS. 3A and 3B illustrate a GUI of an electronic device according to certain embodiments.

Referring to the non-limiting examples of FIGS. 3A and 3B, GUI screens 301 to 306 of an electronic device 300 which performs a method for providing dialog content according to various embodiments are shown. The GUI screens 301 to 306 may be screens where a native messaging service application of the electronic device 300 is executed. As described with reference to FIG. 2, the electronic device 300 may transmit and receive a message to and from a chatbot over an RCS network and a platform server using the native messaging service application. As described with regard to the non-limiting examples of FIGS. 3A and 3B, each of chatbots may be registered in advance with the platform server and may include an NLP module.

Referring to the non-limiting example of FIG. 3A, the electronic device 300 may execute the native messaging service application and may output the GUI screen 301 on a touch screen display. For example, a search field 311 and UI objects 321 indicating a chatroom may be included in the GUI screen 301. A user may enter a keyword (e.g., a contact name, a chatroom name, a chatbot name, a specific keyword, or the like) in the search field 311 to search for a chatroom including the keyword or a user (or a chatbot) indicated by the keyword. For another example, when the user selects one of the UI objects 312 indicating the chatroom, the electronic device 300 may display a chatroom screen corresponding to the selected UI object.

According to some embodiments, the user may perform a touch swipe 31 on any location of the GUI screen 301. The electronic device 300 may output the GUI screen 302 on the touch screen display in response to the touch swipe 31.

According to certain embodiments, a search field 321 and UI objects 322 indicating a chatbot to which the user subscribes may be included in the GUI screen 302. For example, the user may enter a keyword associated with a service he or she wants to receive in the search field 321. The keyword may be transmitted to a platform server which operates, for example, a "chatbot store". The platform server may provide a list of proper chatbot(s) to the user based on the keyword. The UI objects 322 indicating the chatbot may indicate chatbots to which the user subscribes in advance. For example, referring to the UI objects 322, the chatbot to which the user subscribes in advance may include a "customer service (CS) Bot", a "Restaurant", and an "Appliance Bot".

According to various embodiments, the user may perform a selection (touch) 32 of a UI object of the "Appliance Bot" to receive a service provided from the "Appliance Bot". In response to the selection 32, the electronic device 300 may output the GUI screen 303 on the touch screen display.

According to some embodiments, the GUI screen 303 may include information 331 of the "Appliance Bot" selected by the user and a button 332 for starting to chat with the "Appliance Bot". For example, the information 331 of the "Appliance Bot" may include an image associated with the "Appliance Bot", a phone number (e.g., 8215883366) allocated to the "Appliance Bot", a soft button configured to initiate to make a call using the phone number, and a soft button linked to a website operated by the "Appliance Bot".

According to certain embodiments, the user may perform a selection (touch) 33 of the button 332 to start to chat with the "Appliance Bot" (to initiate a chat thread). In response to the selection 33, the electronic device 300 may output the GUI screen 304 shown in FIG. 3B on the touch screen display.

Referring to the GUI screen 304 of FIG. 3B, a chatroom capable of transmitting and receiving a message with the "Appliance Bot" is shown. When a chat with the user of the electronic device 300 is initiated, the "Appliance Bot" may transmit an initial response message (a welcome message) 341 to the electronic device 300 through a platform server (e.g., a platform server 102 of FIG. 1A) and an RCS network (or an RCS network 103 of FIG. 1A). For example, the initial response message 341 received at the electronic device 300 may be an SIP message. The electronic device 300 may display the received initial response message 341 on the chatroom.

For example, the initial response message 341 may include information associated with a description for a service provided from the electronic device 300 and pre-defined UIs (e.g., buttons) 341-1 and 341-2. The pre-defined UIs 341-1 and 341-2 may be displayed together with the description for the service on the chatroom. For example, the button 341-1 may be a button for starting product registration, and the button 342-2 may be a button linked to a webpage operated by a CP (e.g., a maker) of the "Appliance Bot".

According to various embodiments, the user may perform a selection (touch) 34 of the button 342-1 for product registration. In response to the selection 34, the electronic device 300 may output the GUI screen 350 on the touch screen display. According to various embodiments, the user may enter a natural language or a keyword intended for product registration in an input field 343 displayed on a lower end of the chatroom. For example, the user may directly enter a natural language or a keyword in the input field 343 using a soft keyboard. For another example, the user may provide utterance including the natural language or keyword to the electronic device 300. In this case, the electronic device 300 may display a voice-recognized text based on speech to text (STT) technology on the input field 343.

Referring to the GUI screen 305, the electronic device 300 may display a message 351 indicating the selection of the button 342-1, a response message 352 to the message 351, and buttons 353-1 and 353-2 below existing message and buttons 341, 342-1 and 342-2. The response message 352 may be a message generated by the "Appliance Bot" and may include information associated with a notification of taking a photo for product registration and the buttons 352, 353-1, and 353-2. For example, the button 353-1 may be a button for initiating to take a photo, and the button 353-2 may be a button for guiding the user to a location to which a target (e.g., a label) to take a photo.

According to some embodiments, the user may perform a selection (touch) 35 of the button 353-1 to proceed with taking a photo for product registration. In response to the selection 35, the electronic device 300 may output the GUI screen 306 on the touch screen display. According to various embodiments, the user may enter a natural language or a keyword intended to take a photo in an input field 354 displayed on a lower end of the chatroom.

Referring to the GUI screen 306, the electronic device 300 may display a message 361 indicating the selection of the button 353-1 and a response message 362 to the message 361 below existing message and buttons 351, 352, 353-1, and 353-2. The response message 362 may be a message generated by the "Appliance Bot" and may include an image and text for guiding the user to a target (e.g., a label) to take a photo.

According to certain embodiments, the user may perform a selection (touch) 36 of a button 363 located at a lower end of the chatroom to drive a camera. When the selection 36 is performed, the electronic device 300 may drive a camera embedded therein. The user may take a photo of a label of a product using the camera. According to various embodiments, the user may enter a natural language or a keyword intended to drive the camera in an input field 364 located at a lower end of the chatroom.

According to another embodiment, the user may attach a photo of a product label stored in a memory of the electronic device 300, through a separate menu connected through the button 363 located at a lower end of the chatroom, rather than taking a photo of a product label.

Figure 4:
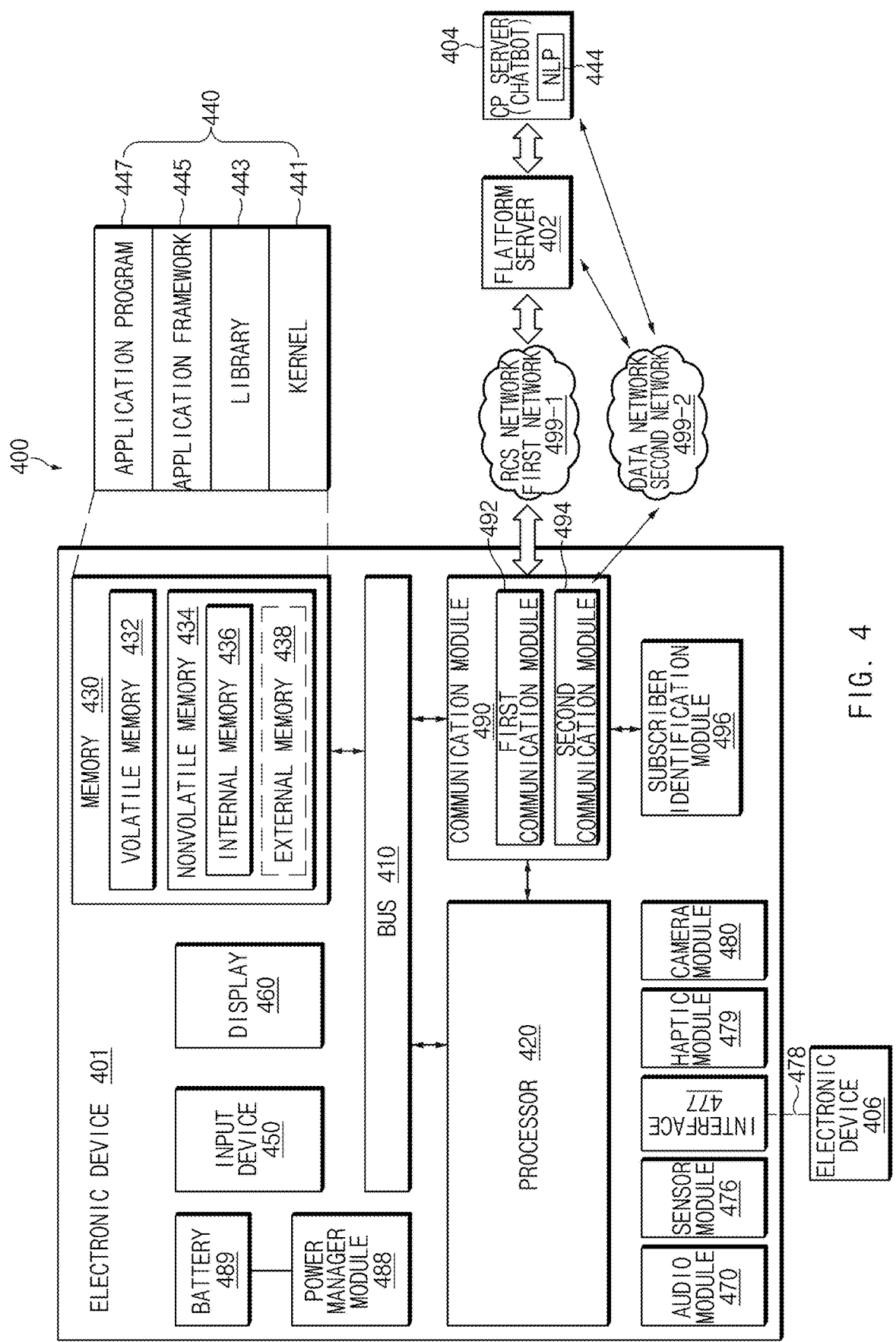
FIG. 4 illustrates, in block diagram format, a configuration of an electronic device in a system according to some embodiments of the present disclosure.

FIG. 4 illustrates, in block diagram format, an electronic device in a system, according to various embodiments.

Referring to the non-limiting example of FIG. 4, an electronic device 401 in a network environment 400 may communicate with a platform server 402 or a CP server (chatbot) 404 over a first network 499-1 (e.g., an RCS network) and a second network 499-2 (e.g., a data network). The electronic device 401, the platform server 402, and the CP server 404 may correspond to an electronic device 101, a platform server 102, and CP servers 104-1 and 104-2, respectively, such as shown in FIG. 1A.

According to some embodiments, the electronic device 401 may include a bus 410, a processor 420, a memory 430, an input device 450 (e.g., a micro-phone or a mouse), a display device 460, an audio module 470, a sensor module 476, an interface 477, a haptic module 479, a camera module 480, a power management module 488, a battery 489, a communication module 490, and a subscriber identification module 496. According to certain embodiments, the electronic device 401 may not include at least one (e.g., the display device 460 or the camera module 480) of the above-described elements or may further include other element(s) (e.g., a housing forming an appearance of the electronic device 401).

The bus 410 may interconnect the above-described elements 420 to 490 and may include a circuit for conveying signals (e.g., a control message or data) between the above-described elements.

The processor 420 may include one or more of a central processing unit (CPU), an application processor (AP), a graphic processing unit (GPU), an image signal processor (ISP) of a camera or a communication processor (CP). According to various embodiments, the processor 420 may be implemented with a system on chip (SoC) or a system in package (SiP).

For example, the processor 420 may drive an operating system (OS) or an application program (e.g., a native messaging service application, a web browser application, a market application, and the like) to control at least one of another element (e.g., hardware or software element) connected to the processor 420 and may process and compute various data. The processor 420 may be electrically connected with load other elements (e.g., the memory 430, the communication module 490), and may load a command or data, which is received from at least one of other elements, into a volatile memory 432 to process the command or data and may store the result data into a nonvolatile memory 434.

According to some embodiments of the present disclosure, performing a specific operation at each of the electronic device 401, the platform server 402, and the CP server 404 may be understood as being performed by a processor included in each of the devices 401, 402, and 404.

The memory 430 may include, for example, the volatile memory 432 or the nonvolatile memory 434. The volatile memory 432 may include, for example, a random access memory (RAM) (e.g., a dynamic RAM (DRAM), a static RAM (SRAM), or a synchronous DRAM (SDRAM)). The nonvolatile memory 434 may include, for example, a programmable read-only memory (PROM), an one time PROM (OTPROM), an erasable PROM (EPROM), an electrically EPROM (EEPROM), a mask ROM, a flash ROM, a flash memory, a hard disk drive (HDD), or a solid-state drive (SSD). In addition, the nonvolatile memory 434 may be configured in the form of an internal memory 436 or the form of an external memory 438 which is available through connection only if necessary, according to the connection with the electronic device 401. The external memory 438 may further include a flash drive such as compact flash (CF), secure digital (SD), micro secure digital (Micro-SD), mini secure digital (Mini-SD), extreme digital (xD), a multimedia card (MMC), or a memory stick. The external memory 438 may be operatively or physically connected with the electronic device 401 in a wired manner (e.g., a cable or a universal serial bus (USB)) or a wireless (e.g., Bluetooth) manner.

For example, the memory 430 may store, for example, at least one different software element, such as a command or data (e.g., the above-described first and/or second corresponding relation) associated with the program 440, of the electronic device 401. The program 440 may include, for example, a kernel 441, a library 443, an application framework 445 or an application program (interchangeably, "application") 447.

The input device 450 may include a microphone, a mouse, or a keyboard. According to some embodiments, the keyboard may include a keyboard physically connected or a virtual keyboard displayed through the display 460.

The display 460 may be exposed through at least one surface (e.g., a front surface, a side surface, or the like) of a housing forming an appearance of the electronic device 401. The display 460 may include a display, a hologram device or a projector, and a control circuit to control a relevant device. The display may include, for example, a liquid crystal display (LCD), a light emitting diode (LED) display, an organic LED (OLED) display, a microelectromechanical systems (MEMS) display, or an electronic paper display. According to certain embodiments, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 401.

The audio module 470 may convert, for example, a sound into an electrical signal or an electrical signal into sound. According to various embodiments, the audio module 470 may acquire sound through the input device 450 (e.g., a microphone) or may output sound through an output device (not illustrated) (e.g., a speaker or a receiver) included in the electronic device 401, an external electronic device (e.g., the electronic device 402 (e.g., a wireless speaker or a wireless headphone)) connected with the electronic device 401 or an electronic device 401 (e.g., a wired speaker or a wired headphone).

The sensor module 476 may measure or detect, for example, an internal operating state (e.g., power or temperature) of the electronic device 401 or an external environment state (e.g., an altitude, a humidity, or brightness) to generate an electrical signal or a data value corresponding to the information of the measured state or the detected state. The sensor module 476 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (FIRM) sensor, an e-nose sensor, an electromyography (EMG) sensor, an electroencephalogram (EEG) sensor, an electrocardiogram (ECG) sensor), a temperature sensor, a humidity sensor, an illuminance sensor, or an UV sensor. The sensor module 476 may further include a control circuit for controlling at least one or more sensors included therein. According to some embodiments, the sensor module 476 may be controlled by using the processor 420 or a processor (e.g., a sensor hub) separate from the processor 420. In the case that the separate processor (e.g., a sensor hub) is used, while the processor 420 is in a sleep state, the separate processor may operate without awakening the processor 420 to control at least a portion of the operation or the state of the sensor module 476.

According to certain embodiments, the interface 477 may include a high definition multimedia interface (HDMI), a universal serial bus (USB), an optical interface, a recommended standard 232 (RS-232), a D-subminiature (D-sub), a mobile high-definition link (MHL) interface, a SD card/MMC (multi-media card) interface, or an audio interface. A connector 478 may physically connect the electronic device 401 and the electronic device 406. According to various embodiments, the connector 478 may include, for example, an USB connector, an SD card/MMC connector, or an audio connector (e.g., a headphone connector).

The haptic module 479 may convert an electrical signal into mechanical stimulation (e.g., vibration or motion) or into electrical stimulation. For example, the haptic module 479 may apply tactile or kinesthetic stimulation to a user. The haptic module 479 may include, for example, a motor, a piezoelectric element, or an electric stimulator.

The camera module 480 may capture, for example, a still image and a moving picture. According to some embodiments, the camera module 480 may include at least one lens (e.g., a wide-angle lens and a telephoto lens, or a front lens and a rear lens), an image sensor, an image signal processor, or a flash (e.g., a light emitting diode or a xenon lamp).

The power management module 488, which is to manage the power of the electronic device 401, may constitute at least a portion of a power management integrated circuit (PMIC).

The battery 489 may include a primary cell, a secondary cell, or a fuel cell and may be recharged by an external power source to supply power at least one element of the electronic device 401.

The communication module 490 may support to establish a communication channel over, for example, the first network 499-1 and the second network 499-2 and may perform communication (e.g., message/data transmission and reception) using the established communication channel. According to certain embodiments, the communication module 490 may include a first communication module 491 and a second communication module 492.

According to various embodiments, the first communication module 491 may communicate over the first network 499-1 (e.g., a telephone network) compliant with a first protocol. The first protocol may include an RCS. The first network 499-1 compliant with the RCS may be referred to as an RCS network. An identifier of each of the devices 401, 402, and 404 which accesses the RCS network may be represented as an MSISDN or an IMSI.

According to some embodiments, the first communication module 491 may support cellular communication. The first communication module 491 may identify and authenticate the electronic device 401 in a communication network using, for example, a subscriber identity module 496. According to certain embodiments, the first communication module 491 may include a CP independent of the processor 420 (e.g., an AP). In this case, the CP may perform at least some of, for example, functions associated with at least one of the elements 410 to 496 of the electronic device 401, rather than the processor 420 while the processor 420 is in an inactive (e.g., sleep) state or together with the processor 420 while the processor 420 is in active state.

According to various embodiments, the second communication module 492 may communicate over the second network 499-2 compliant with a second protocol. The second protocol may include an Internet protocol or the like. The second network 499-2 compliant with the second protocol may include, for example, a data network, the Internet, an IP network, or the like. An identifier of each of the devices 401, 402, and 404 which accesses the second network 499-2 may be represented as a URI.

According to various embodiments, all or a part of operations that the electronic device 401 will perform may be executed by another or a plurality of electronic devices. According to some embodiments, in the case that the electronic device 401 executes any function or service automatically or in response to a request, the electronic device 401 may not perform the function or the service internally, but may alternatively or additionally transmit requests for at least a part of a function associated with the electronic device 401 to any other device. The other electronic device may execute the requested function or additional function and may transmit the execution result to the electronic device 401. The electronic device 401 may provide the requested function or service using the received result or may additionally process the received result to provide the requested function or service. To this end, for example, cloud computing, distributed computing, or client-server computing may be used.

In the non-limiting example of FIG. 4, hardware elements are described with respect to the electronic device 401. The platform server 402 and/or the CP server 404 shown in FIG. 4 may include the same or similar hardware elements to the electronic device 401. Similar to the electronic device 401, the platform server 402 may include, for example, a processor, a memory, a first communication module, and a second communication module. According to various embodiments, the CP server 404 may further include an NLP module 444.

Figure 5:
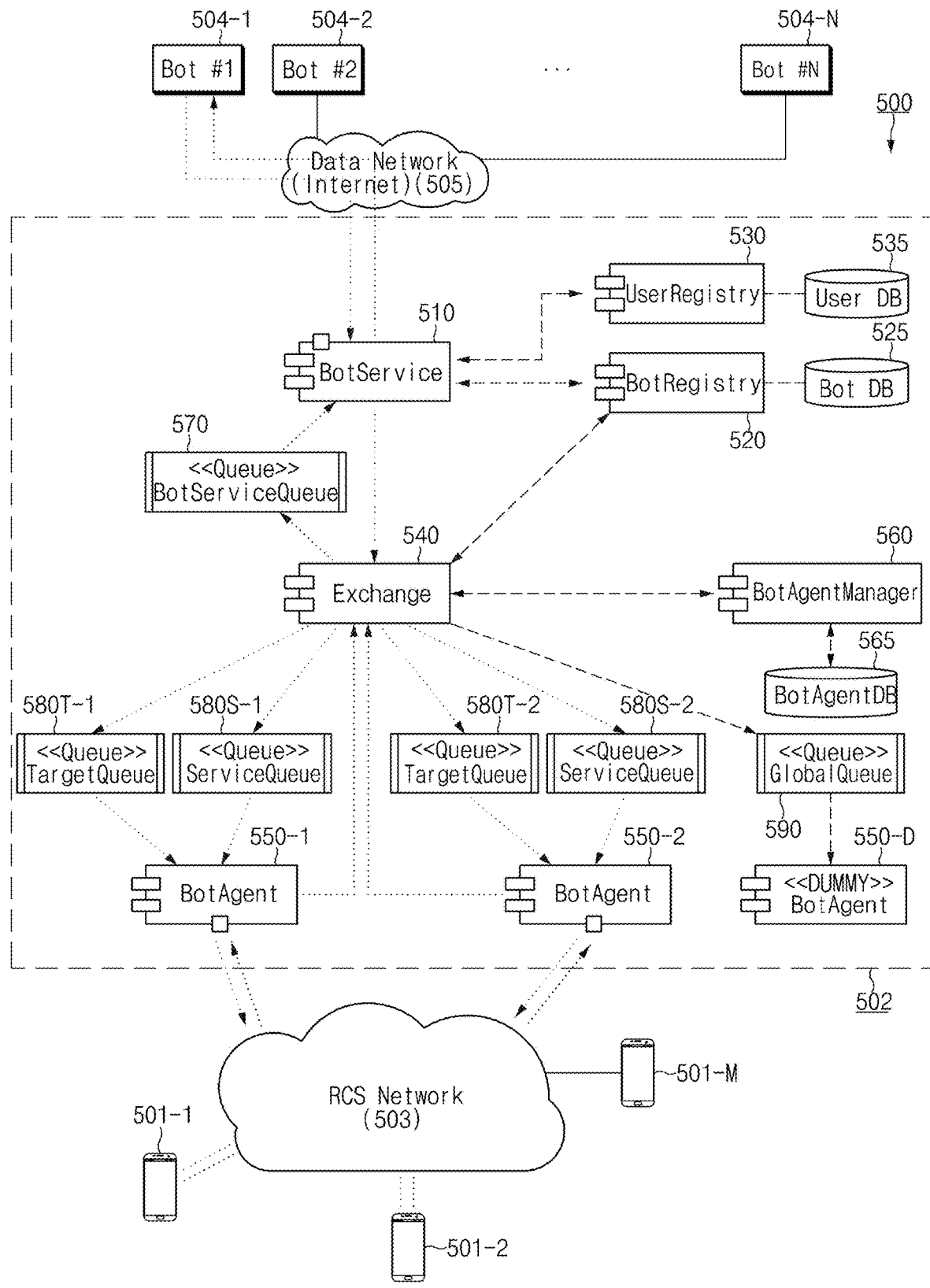
FIG. 5 illustrates, in block diagram format, a platform server according to some embodiments.

FIG. 5 illustrates, in block diagram format, a platform server according to certain embodiments.

Referring to the non-limiting example of FIG. 5, a system 500 for providing dialog content according to various embodiments may include electronic devices 501-1 to 501-M, a platform server 502, an RCS network 503, chatbots 504-1 to 504-N, and a data network 505. According to some embodiments, the platform server 502 may be connected with the plurality of electronic devices 501-1 to 501-M over the RCS network 503 and may be connected with the plurality of chatbots 504-1 to 504-N over the data network (e.g., the Internet) 505.

The platform server 502 according to certain embodiments may include a BotService module 510, a BotRegistry 520, a BotDB 525, a UserRegistry 530, a UserDB 535, an Exchange 540, BotAgents 550-1 and 550-2, a Dummy BotAgent 550-D, a BotAgentManager 560, a BotAgentDB 565, a BotServiceQueue 570, TargetQueues 580T-1 and 580T-2, ServiceQueues 580S-1 and 580S-2, and a GlobalQueue 590. The elements 510 to 590 may be software modules and may be loaded on a memory. A function allocated to each of the elements 510 to 590 may be executed by a computing resource of a processor. Thus, an operation of each of the elements 510 to 590 may be substantially understood as an operation of the processor. Further, the queue and the DB among the elements 510 to 590 may be understood as some elements of the memory.

The BotService module 510 may play a role as an upstream mediator of the system 500 for providing the dialog content. The BotService module 510 may route a message between the chatbots 504-1 to 504-N and the Exchange 540 (a downtown mediator).

According to various embodiments, the BotService module 510 may mutually convert a destination identifier and/or a source identifier of messages processed by the BotService module 510. For example, the BotService module 510 may convert a destination of a UserMessage generated by the first electronic device 501-1 from an MSISDN to a URI and/or may convert a source of the UserMessage from the MSISDN to a unique identifier. For another example, the BotService module 510 may convert a source of a BotMessage generated by the first chatbot 504-1 from a URI to an MSISDN and/or may convert a destination of the BotMessage from a unique identifier to the MSISDN.

For this purpose, the BotService module 510 may communicate with the BotRegistry 520 to retrieve a URI (e.g., a callback-URL) of each of the chatbots 504-1 to 504-N and an MSISDN corresponding to the URI. Further, the BotService module 510 may communicate with the UserRegistry 530 to retrieve a unique identifier (e.g., UserID, ChatID, or the like) of each of the electronic devices 501-1 to 501-M of a user or an MSISDN corresponding to the unique identifier.

According to various embodiments, the BotService module 510 may listen to a create notification from a newly published chatbot and may communicate with the BotRegistry 520 to register the newly published chatbot.

The BotRegistry 520 may manage bot information (e.g., a URI, an MSISDN, or the like of a chatbot) stored in the BotDB 525. For example, the BotRegistry 520 may read/write the bot information under control of the BotService module 510.

The UserRegistry 530 may manage user/subscriber information (e.g., a UserID or a chatID of the user, an MSISDN of an electronic device of the user, or the like) stored in the UserDB 535. For example, the UserRegistry 530 may read/write the user/subscriber information under control of the BotService module 510. According to various embodiments, the UserRegistry 530 may be integrated with the BotRegistry 520 to be managed.

The Exchange 540 may play a role as a downtown mediator of the system 500 for providing the dialog content. According to some embodiments, the Exchange 540 may route messages between the BotAgents 550-1 and 550-2 and the BotService module 510 which is the upstream mediator, using a specified key. The Exchange 540 may be designed based on a messaging broker platform. According to certain embodiments, the Exchange 540 may support publishing for a messaging workflow, subscription, routing, pattern matching, or the like. According to various embodiments, the Exchange 540 may listen to a notification from the BotAgentManager 560 to generate a new BotAgent to be allocated to a newly published chatbot.

Each of the BotAgents 550-1 and 550-2 may be an instance of a chatbot and a contact point of the user. According to various embodiments, each chatbot may be linked with a BotAgent corresponding one to one to each chatbot. For example, the first chatbot 504-1 may communicate with the first BotAgent 550-1, and the second chatbot 504-2 may communicate with the second BotAgent 550-2. The BotAgents 550-1 and 550-2 may communicate with the chatbots 504-1 and 504-2 corresponding respectively to the BotAgents 550-1 and 550-2 to collect messages generated by the electronic devices 501-1 to 501-M of the user or transmit and distribute messages to the electronic devices 501-1 to 501-M of the user. According to at least one embodiment, the chatbot and the BotAgent correspond to one another. However, embodiments are not limited thereto. According to various embodiments, a single chatbot may be linked with two or more BotAgents. For example, as a chatbot transmits and receives a plurality of messages with a plurality of electronic devices, when communication traffic is concentrated on one BotAgent, an additional BotAgent linked to the chatbot may be allocated for load balancing.

According to certain embodiments, the BotAgents 550-1 and 550-2 may convert a format of a UserMessage generated by each of the electronic devices 501-1 to 501-M from an RCS format (an SIP message format) to a format suitable for a data network. Further, on the other hand, the BotAgents 550-1 and 550-2 may convert a format of a BotMessage generated by each of the chatbots 504-1 to 504-N from a format based on the data network to the RCS format (the SIP message format).

Further, according to various embodiments, after receiving the MSISDN, the chatbots 504-1 and 504-2 may serve the user over the RCS network 503. The BotAgents 550-1 and 550-2 corresponding respectively to chatbots 504-1 and 504-2 may play a role in managing an MSISDN of each of chatbots 504-1 and 504-2, register with the RCS network 503, or interfacing with a plurality of users.

A Dummy BotAgent 550-D may be a reserved BotAgent which is not allocated to any chatbot. The Dummy BotAgent 550-D may be allocated to a newly published chatbot by, for example, the BotAgentManager 560.

The BotAgentManager 560 may manage a status of each of both the BotAgents 550-1 and 550-2 registered in the BotAgentDB 565. For example, when the second BotAgent 550-2 does not transmit a signal of alive, the BotAgentManager 560 may dispose the second BotAgent 550-2 again. For another example, when a specific BotAgent is overloaded, the BotAgentManager 560 may allocate an additional BotAgent. In another example, when a newly published chatbot is registered, the BotAgentManager 560 may allocate the Dummy BotAgent 550-D to the newly published chatbot.

The BotServiceQueue 570 may be a shared memory for communication between the Exchange 540 and the BotService module 510. The BotServiceQueue 570 may be handled by the BotService module 510. The BotService module 510 may use two channels to transmit and receive a UserMessage and a BotMessage. Between the two channels, the BotServiceQueue 570 may configure a receive channel of a UserMessage generated by each of the electronic devices 501-1 to 501-M of the user.

The TargetQueues 580T-1 and 580T-2 and the ServiceQueues 580S-1 and 580S-2 may be shared memories in which a BotMessage generated by each of the chatbots 504-1 to 504-N is stored before being transmitted to the BotAgents 550-1 and 550-2. The TargetQueues 580T-1 and 580T-2 and the ServiceQueues 580S-1 and 580S-2 may configure a transmit channel of a BotMessage generated by each of the chatbots 504-1 to 504-N.

The TargetQueues 580T-1 and 580T-2 and the ServiceQueues 580S-1 and 580S-2 may be handled by the BotAgents 550-1 and 550-2 corresponding respectively to the TargetQueue 580T-1 and 580T-2 and the ServiceQueues 580S-1 and 580S-2. For example, the TargetQueue 580T-1 and the ServiceQueue 580S-1 may be handled by the first BotAgent 550-1.

The GlobalQueue 590 may be handled by the Dummy BotAgent 550-D. When a newly published chatbot is allocated to the Dummy BotAgent 550-D, the corresponding BotAgent may start to handle a TargetQueue or a ServiceQueue.

According to some embodiments, the first electronic device 501-1 may generate a UserMessage (e.g., an SIP message) on a chat thread with the first chatbot 504-1 and may transmit the UserMessage to the first BotAgent 550-1 over the RCS network 503. The first BotAgent 550-1 may convert a format of a received message from a format of an SIP message to a format suitable for the data network 505 and may transmit the converted message to the Exchange 540. The Exchange 540 may route a received message and may store the message in the BotServiceQueue 570. The BotService module 510 may read the message stored in the BotServiceQueue 570 and may convert a destination of the message from an MSISDN to a URI with reference to the BotRegistry 520. Subsequently, the BotService module 510 may transmit the message to the first chatbot 504-1 indicated by the URI over the data network 505.

According to other embodiments, the first chatbot 504-1 may generate a response message, a destination of which is set to a unique identifier of the first electronic device 501-1, and may transmit the response message to the BotService module 510 over the data network 505. The BotService module 510 may convert the destination of the response message into an MSISDN of the first electronic device 501-1 with reference to the UserRegistry 530 and may transmit the converted response message to the Exchange 540. The Exchange 540 may route the received response message and may store the response message in the first TargetQueue 580T-1 handled by the first BotAgent 550-1. The first BotAgent 550-1 may read the response message stored in the first TargetQueue 580T-1 and may convert a format of a message into a format of an SIP message. Subsequently, the first BotAgent 550-1 may transmit the response message to the first electronic device 501-1 indicated by the MSISDN over the RCS network 503.

According to various embodiments, the response message may be an initial response message (for example, a welcome message) or may be a broadcast message transmitted to all electronic devices which subscribe to a service provided by the first chatbot 504-1. According to various embodiments, although there is a message transmitted to the electronic devices 501-1 to 50-1M which once transmitted and received the message, when a message transmission channel between a BotAgent and an electronic device is disconnected, the response message may be transmitted. In this case, the Exchange 540 may route the message and may store the message in the first service queue 580S-1 handled by the first BotAgent 550-1. The first BotAgent 550-1 may read the message stored in the first ServiceQueue 580S-1 and may transmit the read message to an electronic device where a chat thread is initiated (in case of an initial response message) or all electronic devices which subscribe to a service provided by the first chatbot 504-1 (in case of a broadcast message).

The above-mentioned operation of each of the elements 510 to 590 of the platform server 502 is for explanation only, and the disclosure is not limited to the example of FIG. 5. Hereinafter, in FIGS. 6A to 6E, a description will be given of detailed elements of the BotService module 510, the BotRegistry 520, the Exchange 540, the (first) BotAgent 550-1, and the BotAgentManager 560.

Figure 6A:
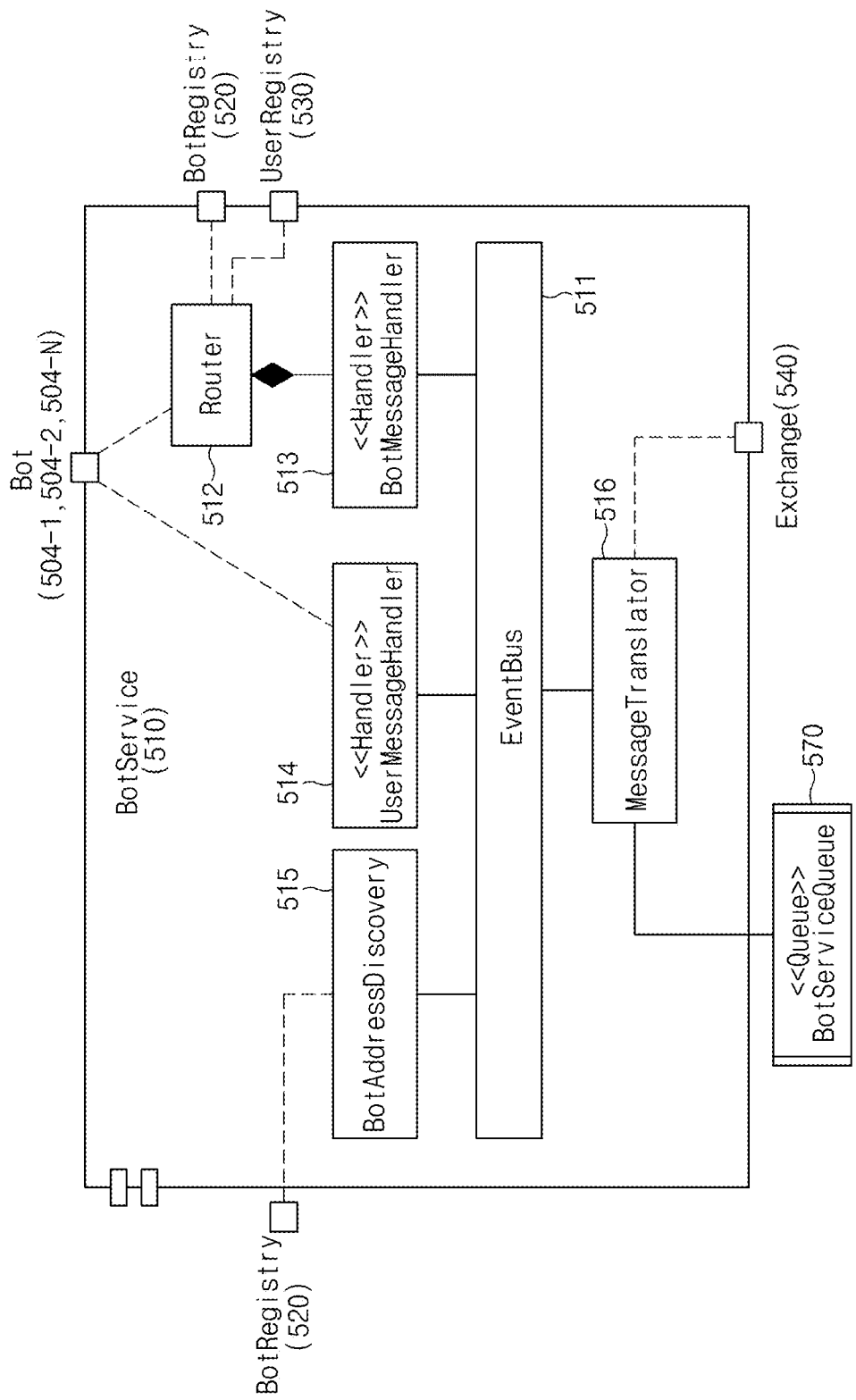
FIG. 6A illustrates a BotService module according to certain embodiments.

FIG. 6A illustrates a BotService module according to certain embodiments.

Referring to the non-limiting example of FIG. 6A, a BotService module 510 may be designed based on an event based model. The BotService module 510 may include an EventBus 511, a router 512, a BotMessageHandler 513, a UserMessageHandler 514, a BotAddressDiscovery module 515, and a MessageTranslator 516.

The EventBus 511 may provide an environment capable of easily adding a new component in the future.

The router 512 may receive a message from three source ports, that is, a "Bot-port" connected with chatbots 504 to 504-N, a "BotRegistry-port" connected with a BotRegistry 520, and a "UserRegistry-port" connected with a UserRegistry 530 and may route the message to a specific MessageSender. For example, the router 512 may receive a message indicating a type (e.g., a general type, a broadcast type, or the like) of a message from the "Bot-port". The router 512 may receive a control message for managing (e.g., generating, deleting, or like) a BotDB 525 and a UserDB 535 of FIG. 5 from the "BotRegistry-port" and the "UserRegistry-port". Each of such messages may be routed to a specified handler.

The BotMessageHandler 513 may transmit a response (e.g., confirm, an error, or the like) or may handle specific messages pushed to the EventBus 511. According to various embodiments, the BotMessageHandler 513 may handle a SEND message sent to a chatbot by a user, a REPLY message transmitted to the user by the chatbot, a BROADCAST message transmitted to a plurality of users by the chatbot, or the like.

According to some embodiments, the BotMessageHandler 513 may handle a REGISTER message for the BotRegistry 520 to notify a BotService module 510 that a new bot is published. Further, the BotMessageHandler 513 may handle a DEREGISTER message for the BotRegistry 520 to notify the BotService module 510 that a specific bot is unpublished.

The UserMessageHandler 514 may consume a message having a SEND type, targeted from the user to a chatbot, from the EventBus 511. The UserMessageHandler 514 may handle a SEND message transmitted to the chatbot by the user.

The UserMessageHandler 514 may transmit a response to a source (i.e., an electronic device of the user) and may transmit a message to the chatbot. The UserMessageHandler 514 may query about an identifier of a specific bot using the BotAddressDiscovery module 515 to transmit the message to the chatbot. The UserMessageHandler 514 may push a searching request to the EventBus 511 to discover an identifier of a bot. When a response arrives from the BotAddressDiscovery module 515, the UserMessageHandler 514 may transmit a message to the discovered identifier.

The BotAddressDiscovery module 515 may consume a request (or query) message from requesting to search for an address of a specific bot from the EventBus 511. The BotAddressDiscovery module 515 may query the BotRegistry 520 and may push the result to the EventBus 511.

The MessageTranslator 516 may transmit or consume messages between the EventBus 511 and an Exchange 540. The MessageTranslator 516 may transmit a UserMessage generated by an electronic device of the user, stored in a BotServiceQueue 570, to the EventBus 511.

Figure 6B:
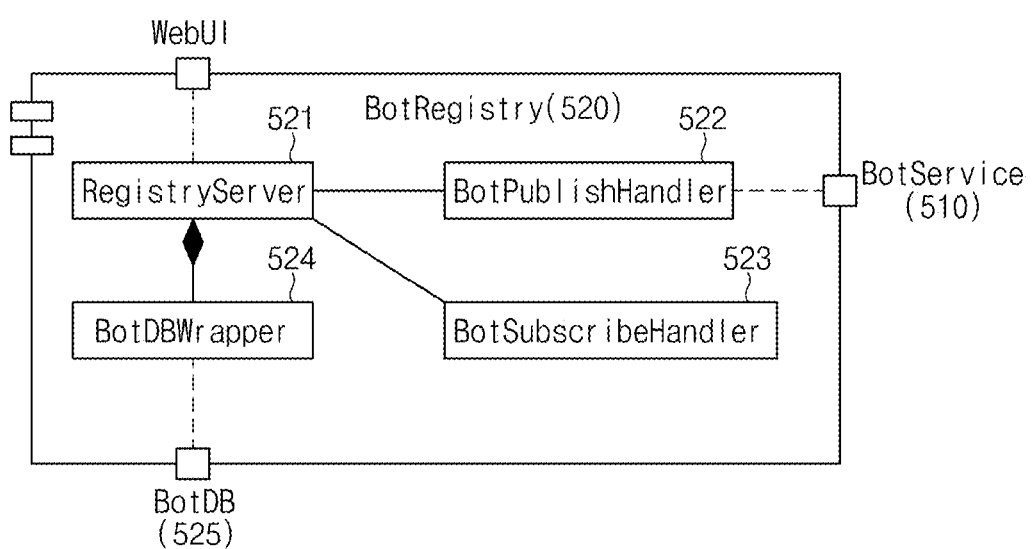
FIG. 6B illustrates a BotRegistry according to some embodiments.

FIG. 6B illustrates a BotRegistry according to certain embodiments.

Referring to the non-limiting example of FIG. 6B, a BotRegistry 520 may manage bot information stored in a BotDB 525. According to various embodiments, the BotRegistry 520 may be integrated with a UserRegistry 530 of FIG. 5 to be managed. In this case, the BotRegistry 520 may manage a chatbot and information of users (subscribers) who subscribe to a service provided by the chatbot. The BotRegistry 520 may play a role as a back-end of a chatbot store and a developer portal.

According to various embodiments, the BotRegistry 520 may include a RegistryServer 521, a BotPublishHandler 522, a BotSubscribeHandler 523, and a BotDBWrapper 524.

The RegistryServer 521 may analyze a request about a chatbot or a user, received from a WebUI (e.g., a UI of a chatbot store webpage or a UI by a chatbot store application), a BotService module 510, or electronic devices 501-1 to 501-M of FIG. 5 and may then transmit the analyzed result to a specified handler (e.g., the BotPublishHandler 522, the BotSubscribeHandler 523, and the like). The BotPublishHandler 522 may process and store information about a newly registered chatbot using the BotDBWrapper 524. Further, the BotPublishHandler 522 may notify the BotService module 510 that a new chatbot is published to proceed with an additional procedure of a BotAgent, described with reference to FIG. 6A. The BotDBWrapper 524 may help the BotDB 525 to execute a related procedure.

Figure 6C:
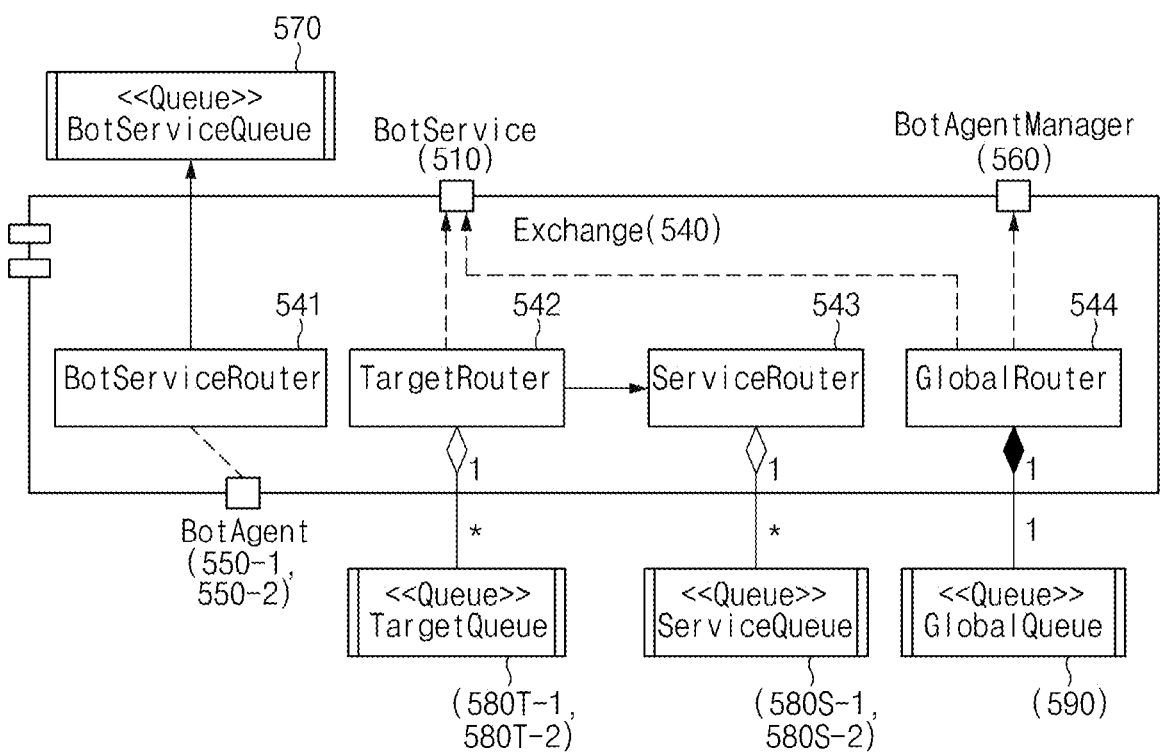
FIG. 6C illustrates an Exchange according to some embodiments.

FIG. 6C illustrates an Exchange according to some embodiments.

Referring to the non-limiting example of FIG. 6C, an Exchange 540 may include various routers for message transmission. According to certain embodiments, the Exchange 540 may include a BotServiceRouter 541, a TargetRouter 542, a ServiceRouter 543, and a GlobalRouter 544.

The BotServiceRouter 541 may receive a message from BotAgents 550-1 and 550-2 respectively targeted to chatbots. The message may be published to a BotServiceQueue 570 and may be transmitted to a BotService module 510.

The TargetRouter 542 may receive a message from a chatbot associated with the BotAgents 550-1 and 550-2. The TargetRouter 542 may route the message by using an identifier of an electron device which receives the message as a key. The key may be unique per message. The TargetRouter 542 may select TargetQueues 580T-1 and 580T-2 to which a chatbot wants to transmit a message.

The ServiceRouter 543 may be an alternative to the TargetRouter 542. For example, although the message is an initial response message (a welcome message) or a broadcast message or although the message is a message for the electronic device 501-1 to 501-M which once transmitted and received the message, when an existing message transmission channel between a BotAgent and an electronic device is disconnected due to any cause, the TargetRouter 542 does not find the TargetQueues 580T-1 and 580T-2. In this case, the message may be transmitted to the ServiceRouter 543. The ServiceRouter 543 may have ServiceQueues 580S-1 and 580S-2 mapped one to one or one to N to the chatbot using a Bot-ID of the chatbot. Such a message may be routed to one BotAgent mapped to a specific chatbot, depending on a routing policy between the BotAgents 550-1 and 550-2.

The GlobalRouter 544 may play a role as a path for publishing a new bot. When the new chatbot is published, the GlobalRouter 544 may transmit a CREATE message to a BotAgent for the new chatbot, and the BotAgent may generate a connection relationship for a ServiceQueue. Thus, a new bot may be ready to provide a service.

Figure 6D:
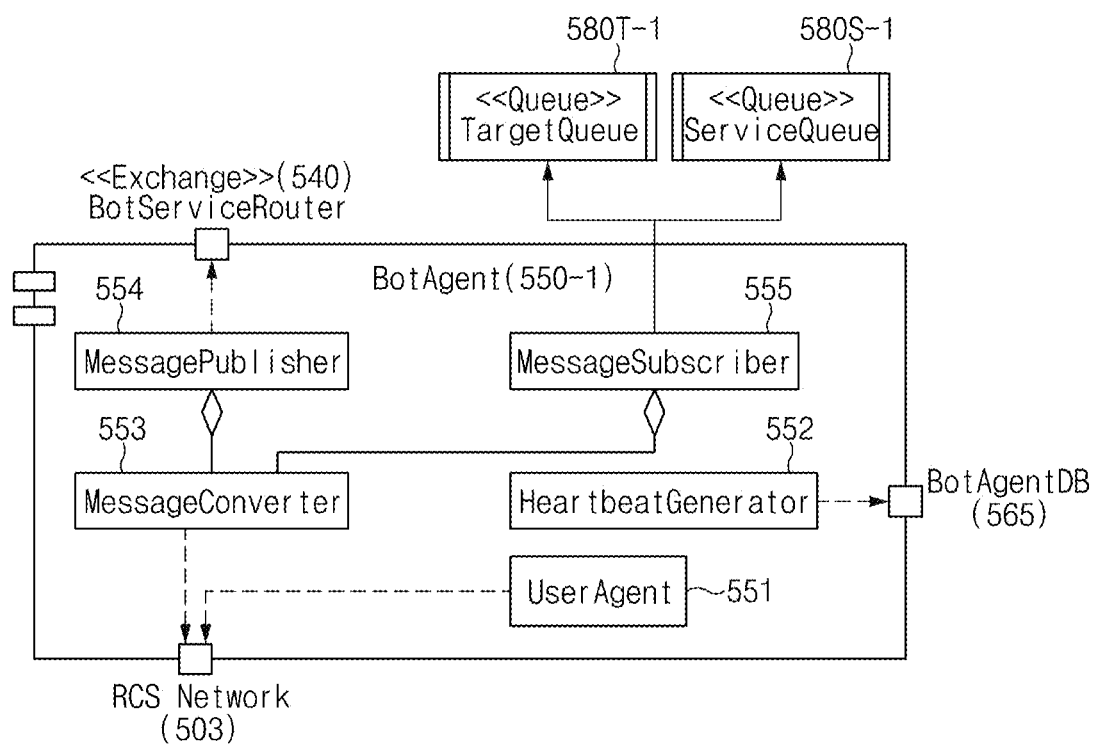
FIG. 6D illustrates a BotAgent according to certain embodiments.

FIG. 6D illustrates a BotAgent according to various embodiments.

Referring to the non-limiting example of FIG. 6D, a first BotAgent 550-1 according to some embodiments may include a UserAgent 551, a HeartbeatGenerator 552, a MessageConverter 553, a MessagePublisher 554, and a MessageSubscriber 555. A second BotAgent 550-2 shown in FIG. 5 may include the same or similar elements to the first BotAgent 550-1.

The UserAgent 551 may register an RCS identifier (an MSISDN) allocated to a first chatbot 504-1 of FIG. 5 with an RCS network 503. The UserAgent 551 allocated to the first chatbot 504-1 may be regarded as one device (or subscriber) to be similar to electronic devices 501-1 to 501-M of a user in the RCS network 503.

The HeartbeatGenerator 552 may transmit a signal of alive for providing a notification that the first BotAgent 550-1 is operating to a BotAgentManager 560 of FIG. 5 on a periodic basis. For this purpose, the HeartbeatGenerator 552 may write a BotAgent's status in a BotAgentDB 565 on a periodic basis.

The MessageConverter 553 may convert a format of a message (an SIP message) based on the RCS network 503 into a format capable of being transmitted and received on a data network 505 of FIG. 5, or vice versa.

The MessagePublisher 554 may transmit a message generated by each of the electronic device 501-1 to 501-M of the user to an Exchange 540.

The MessagePublisher 554 may read a message generated by the first chatbot 504-1 from a first TargetQueue 580T-1 or a first ServiceQueue 580S-1 and may transmit the read message to the MessageConverter 553.

Figure 6E:
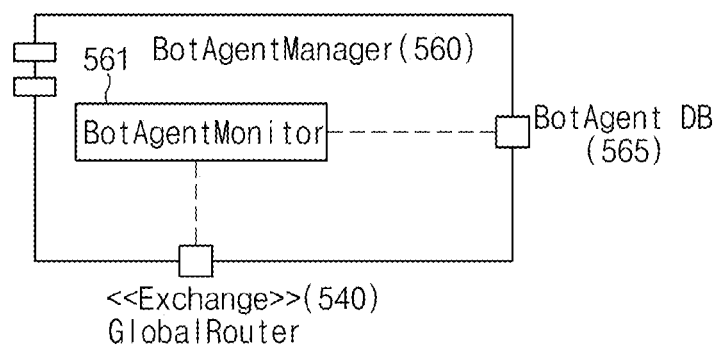
FIG. 6E illustrates a BotAgentManager according to some embodiments.

FIG. 6E illustrates a BotAgentManager according to certain embodiments.

Referring to the non-limiting example of FIG. 6E, a BotAgentManager 560 according to various embodiments may communicate with a BotAgentDB 565 to manage all BotAgents 550-1, 550-2, and 550-D registered in the BotAgentDB 565. The BotAgentManager 560 may transmit a message for managing the BotAgents 550-1, 550-2, and 550-D to an Exchange 540.

According to some embodiments, the BotAgentManager 560 may include a BotAgentMonitor 561. For example, the BotAgentMonitor 561 may determine whether a BotAgent is operated, depending on whether the BotAgent transmits a signal of alive (e.g., a heartbeat signal).

Figure 7:
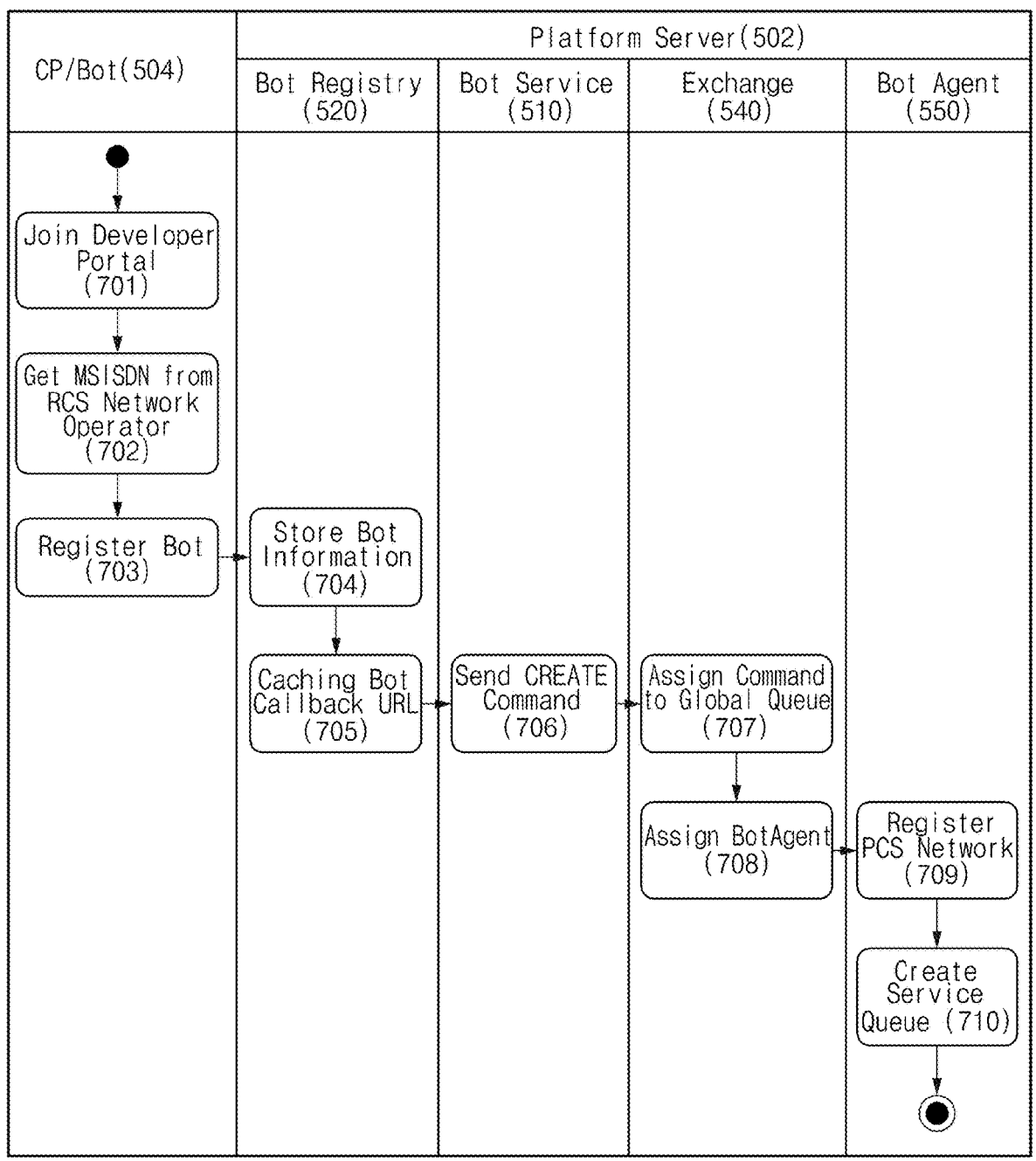
FIG. 7 illustrates operations of a method for registering a chat bot with a platform server according to some embodiments.

FIG. 7 illustrates operations of a method for registering a chatbot with a platform server according to certain embodiments.

Referring to the non-limiting example of FIG. 7, a method for registering the chatbot according to various embodiments may include operations 701 to 710. Operations 701 to 710 may correspond to operations 211 and 212 of registering a CP server in FIG. 2. In describing FIG. 7, reference numerals used in FIG. 5 and FIGS. 6A to 6E will, as appropriate, be used.

In operation 701, a CP may join a developer portal (e.g., a chatbot store webpage or a chatbot store application) operated by a platform server 502.

In operation 702, the CP may be allocated an MSISDN for a chatbot 504 from an RCS network operator.

In operation 703, the CP may request the platform server 502 to register the chatbot 504.

In operation 704, a BotRegistry 520 of the platform server 502 may store information about the chatbot 504 in a BotDB 525 of FIG. 5.

In operation 705, the BotRegistry 520 of the platform server 502 may cache a callback-URL of the chatbot 504.

In operation 706, a BotService module 510 of the platform server 502 may provide a CREATE command to create a BotAgent to be allocated to the chatbot 504 to an Exchange 540.

In operation 707, the Exchange 540 of the platform server 502 may assign the CREATE command to a GlobalQueue 590 of FIG. 5.

In operation 708, the Exchange 540 of the platform server 502 may assign the BotAgent 550 to be allocated to the chatbot 504.

In operation 709, the assigned BotAgent 550 may register an MSISDN of the chatbot 504 with an RCS network.

In operation 710, the BotAgent 550 may create a ServiceQueue and may bind the created ServiceQueue.

Figure 8:
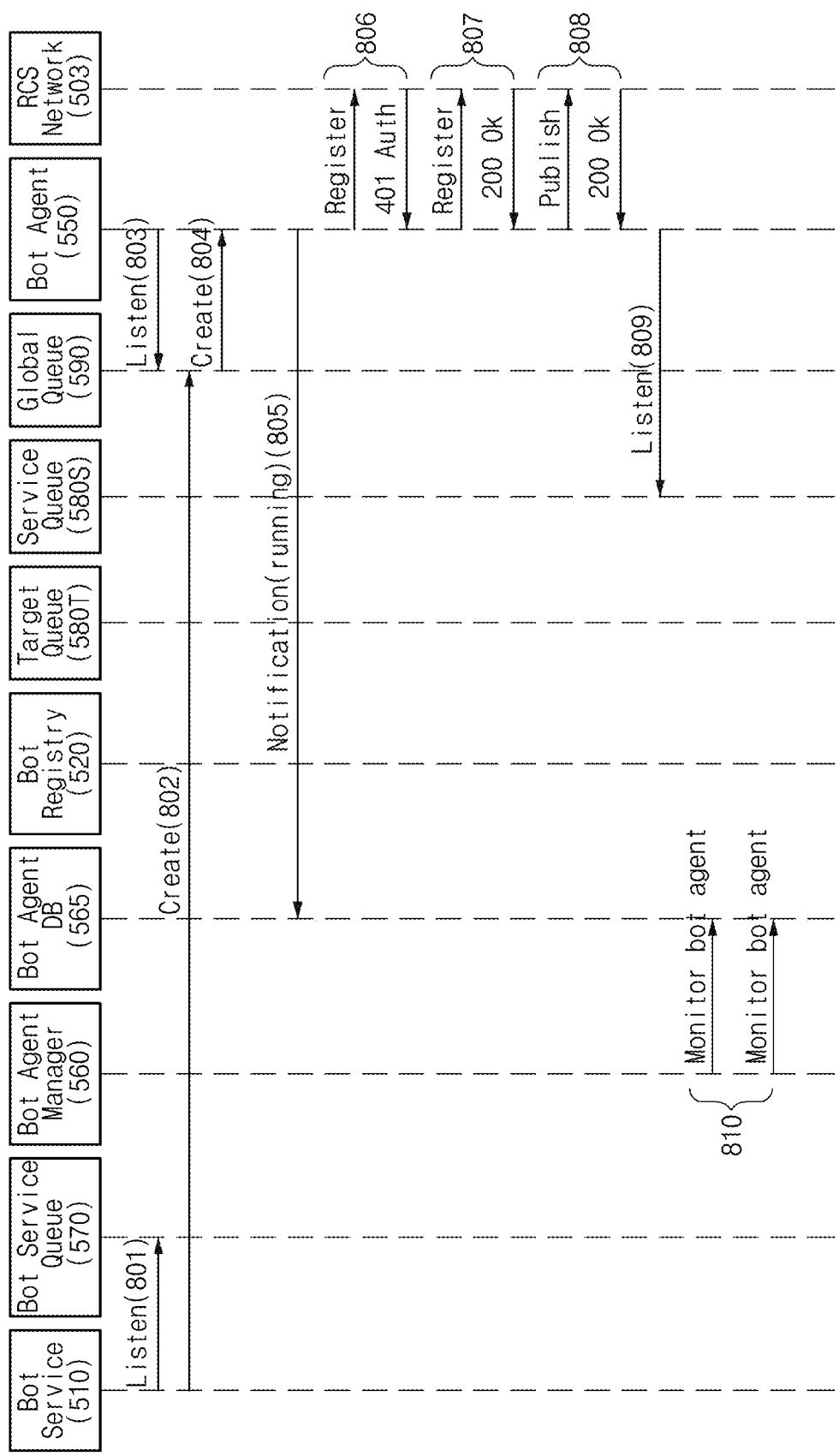
FIG. 8 illustrates operations of a platform server when registering a chatbot according to certain embodiments.

FIG. 8 illustrates operations of a platform server when registering a chatbot according to some embodiments.

Referring to the non-limiting example of FIG. 8, the operation of the platform server when registering the chatbot according to certain embodiments may include operations 801 to 810. Operations 801 to 810 may correspond to operation 212 of registering a CP server in FIG. 2 and operations 706 to 710 of FIG. 7. In a description of FIG. 8, reference numerals in FIG. 5 and FIGS. 6A to 6E will be used as appropriate.

In operation 801, a BotService module 510 may listen to a BotServiceQueue 570.

In operation 802, the BotService module 510 may assign a CREATE command to create a BotAgent to be allocated to a chatbot to a GlobalQueue 590.

In operation 803, a Dummy BotAgent 550 may listen to the GlobalQueue 590.

In operation 804, the Dummy BotAgent 550 may read a CREATE command to create a BotAgent from the GlobalQueue 590. Thus, the Dummy BotAgent 550 may be converted into a BotAgent 550 corresponding to the chatbot.

In operation 805, the BotAgent 550 may notify a BotAgentDB 565 of a status of the BotAgent 550.

In operation 806, the BotAgent 550 may request an RCS network to register an MSISDN of the chatbot and may perform user authentication in response to the request.

In operation 807, the BotAgent 550 may register the MSISDN of the chatbot with the RCS network and may receive an OK message in response to the registration.

In operation 808, the BotAgent 550 may publish the chatbot to the RCS network and may receive an OK message in response to the publication.

In operation 809, the BotAgent 550 may listen to a ServiceQueue 580S.

Thereafter, in operation 810, a BotAgentManager 560 may monitor an operation status of the BotAgent 550 with reference to a BotAgentDB 565.

According to various embodiments, a specific BotAgent allocated to a chatbot may fail to register with the RCS network or an operation of the specific BotAgent may be stopped due to various causes. In this case, a BotAgentManager (for example, a BotAgentManager 560 of FIG. 5) may detect a problem of the BotAgent which fails to register the MSISDN of the chatbot. Under control of the BotAgentManager, the BotAgent which fails to register the MSISDN of the chatbot may delete its resource. A platform server may resume a new registration procedure (e.g., operations 801 to 810 of FIG. 2).

Further, according to various embodiments, a developer of a chatbot may delete a chatbot which is no longer valid. When a request for the developer to delete the chatbot is transmitted to a platform server 502, the BotService module 510 may transmit a DELETE command to delete a BotAgent corresponding to the chatbot of the developer to the BotAgent. Receiving the DELETE command, the BotAgent may deregister the chatbot on the RCS network 503 and may delete its resource from a BotAgentDB 565 of FIG. 5. When the deletion is completed, the BotAgent may notify a BotRegistry 520 and/or the BotAgentManager 560 that the BotAgent is deleted.

Figure 9:
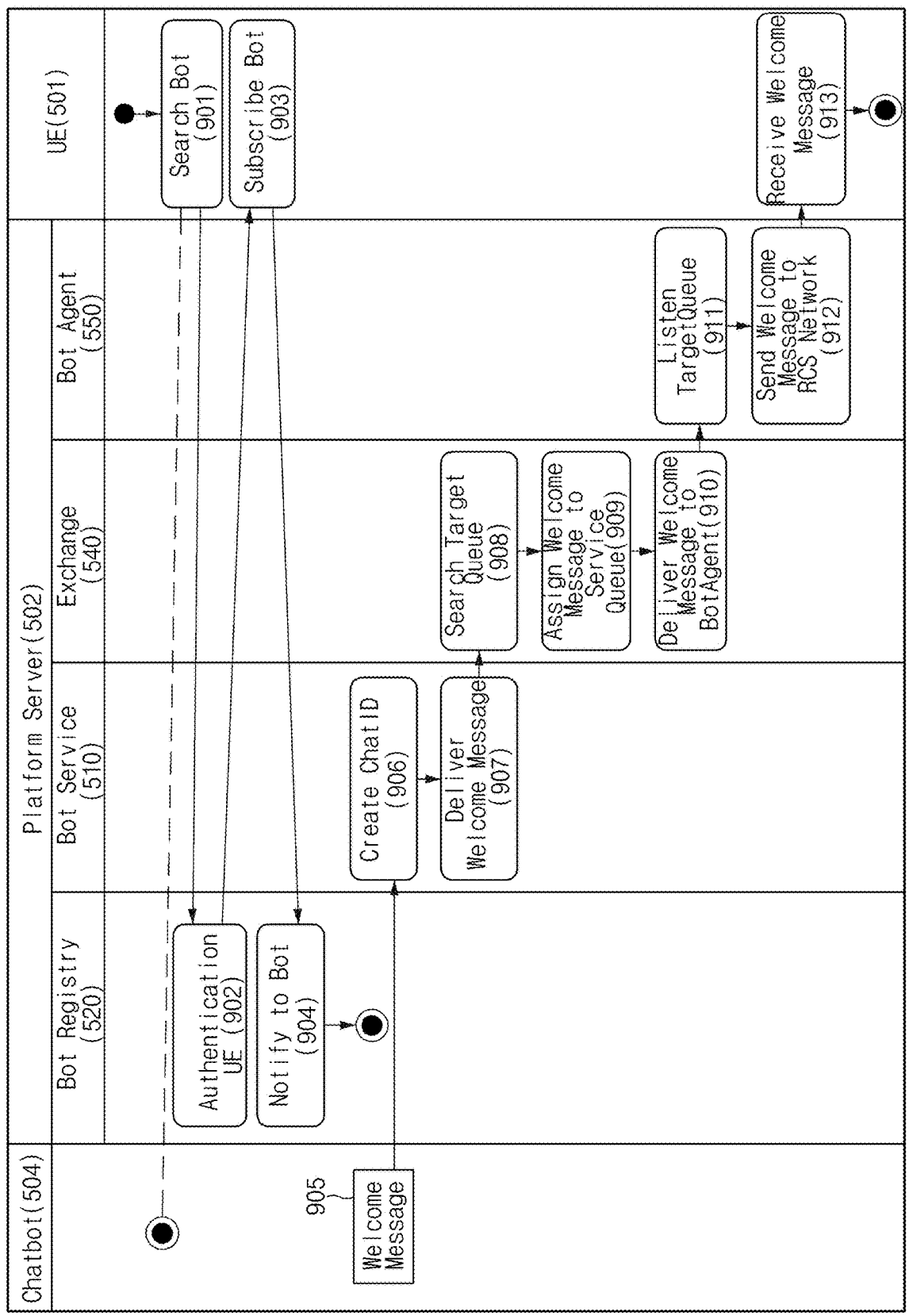
FIG. 9 illustrates operations of a method for subscribing to a chatbot according to some embodiments.

FIG. 9 illustrates operations of a method for subscribing to a chatbot according to various embodiments.

Referring to the non-limiting example of FIG. 9, a method for subscribing to the chatbot according to some embodiments may include operations 901 to 913. Operations 901 to 913 may correspond to operations 221 to 228 of subscribing to a CP server in FIG. 2. Operations 901 to 913 of FIG. 9 may be performed after, for example, chatbot registration in FIG. 7. In a description of FIG. 9, reference numerals used in FIG. 5 and FIGS. 6A to 6E will, as appropriate, be used.

In operation 901, a user of user equipment (UE) 501 may search a chatbot 504 with a platform server 502.

In operation 902, a BotRegistry 520 of the platform server 502 may authenticate the UE 501.

In operation 903, the UE 501 may send a message for requesting to subscribe to the platform server 502.

In operation 904, the BotRegistry 520 of the platform server 502 may notify subscription by the UE 501 by sending a notification message.

In operation 905, the chatbot 504 may send a welcome message (an initial response message) to the platform server 502.

In operation 906, a BotService module 510 of the platform server 502 may create a ChatID indicating a chat thread between the UE 501 and the chatbot 504.

In operation 907, the BotService module 510 of the platform server 502 may deliver the welcome message to an Exchange 540.

In operation 908, the Exchange 540 of the platform server 502 may search a TargetQueue (e.g., a TargetQueue 580T of FIG. 5) correspond to the chatbot 504.

In operation 909, since the UE 501 and the chatbot 504 do not transmit and receive a message previously (since there is no bound TargetQueue 580T), the Exchange 540 of the platform server 502 may alternatively assign a ServiceQueue 580S.

In operation 910, the Exchange 540 of the platform server 502 may deliver the welcome message to a BotAgent 550.

In operation 911, the BotAgent 550 of the platform server 502 may listen to the TargetQueue 580T.

In operation 912, the BotAgent 550 of the platform server 502 may send the welcome message to the UE 501 over an RCS network.

In operation 913, the UE 501 may receive the welcome message. For example, the UE 501 may display the welcome message on a display (e.g., a display device 460 of FIG. 4).

Figure 10:
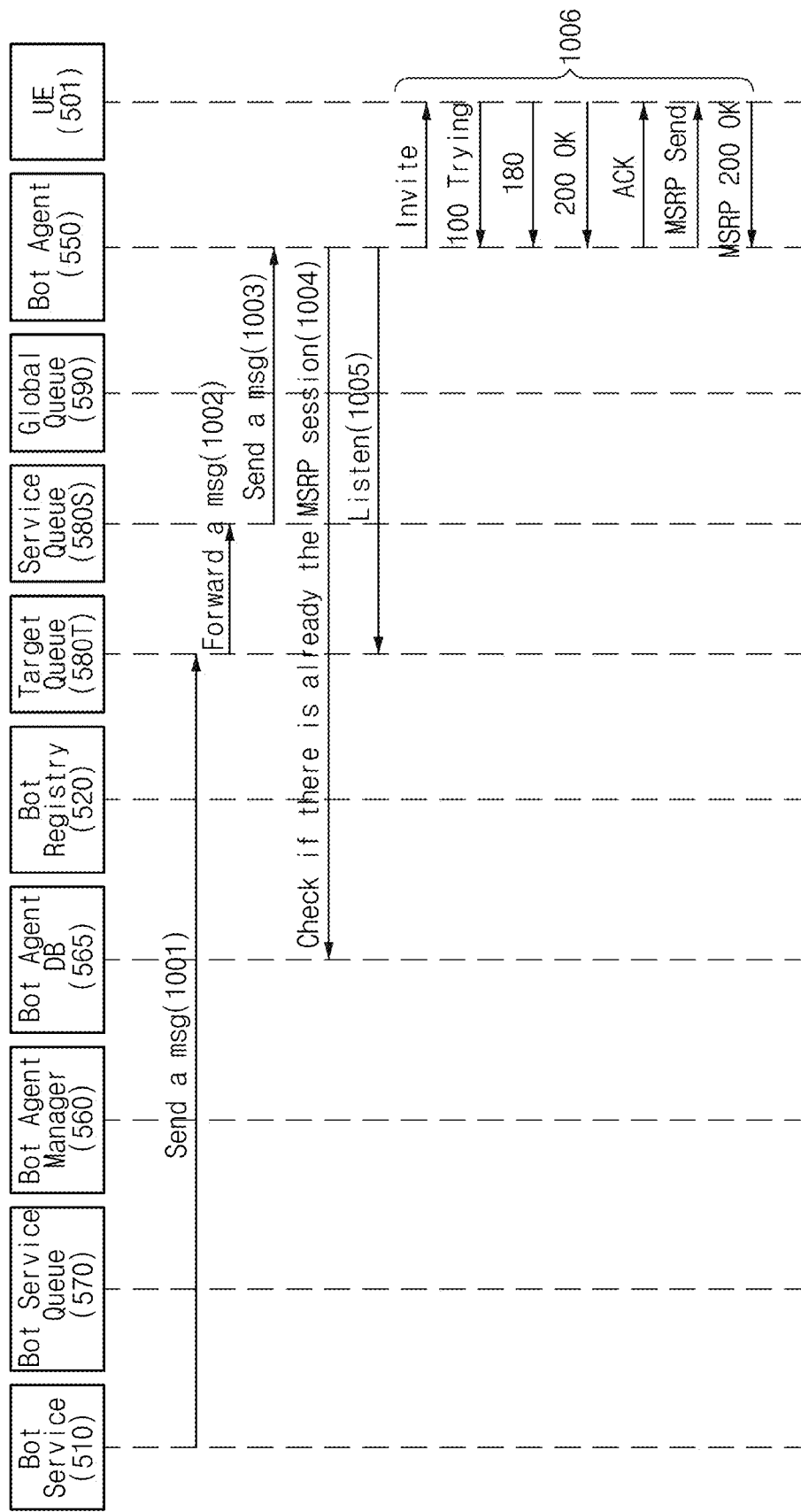
FIG. 10 illustrates operations of a platform server when subscribing to a chatbot according to some embodiments.

FIG. 10 illustrates operations of a platform server when subscribing to a chatbot according to certain embodiments.

Referring to the non-limiting example of FIG. 10, the operation of the platform server when subscribing to the chatbot according to various embodiments may include operations 1001 to 1006. Operations 1001 to 1006 may correspond to operations 225 to 228 of FIG. 2 and operations 907 to 913 of FIG. 7. In a description of FIG. 10, reference numerals used in FIG. 5 and FIGS. 6A to 6E will be used.

In operation 1001, a BotService module 510 may send a welcome message, received from a chatbot 504, to a TargetQueue 580T.

In operation 1002, since a UE 501 and the chatbot 504 do not transmit and receive a message previously (since there is no bound TargetQueue 580T), an Exchange 540 of a platform server 502 may forward the welcome message, received at the TargetQueue 580T, to a ServiceQueue 580S.

In operation 1003, a BotAgent 550 of the platform server 502 may read the welcome message from the ServiceQueue 580S.

In operation 1004, the BotAgent 550 of the platform server 502 may determine whether there is already a message session relay protocol (MSRP) session with the UE 501 by referring to a BotAgentDB 565.

In operation 1005, since UE 501 and the chatbot 504 do not transmit and receive a message previously, the BotAgent 550 of the platform server 502 may newly listen to the TargetQueue 580T.

In operation 1006, the BotAgent 550 of the platform server 502 may initiate the MSRP session and may then send the welcome message to the UE 501 ("MSRP Send").

Figure 11:
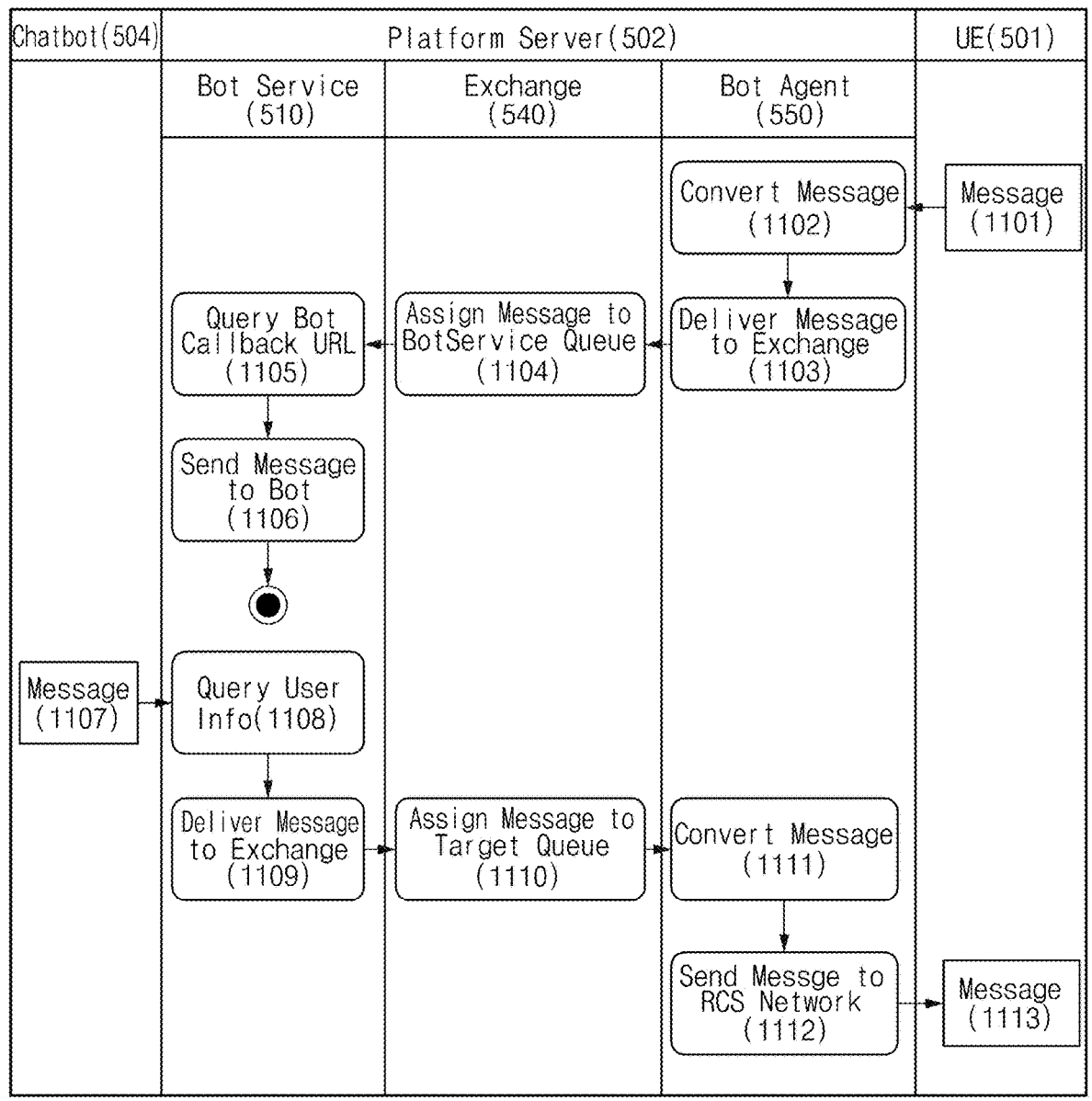
FIG. 11 illustrates operations a chat method according to certain embodiments.

FIG. 11 illustrates operations of a chat method according to some embodiments.

Referring to the non-limiting example of FIG. 11, the chat method according to certain embodiments may include operations 1101 to 1113. Operations 1101 to 1113 may correspond to chat operations 231 to 238 of FIG. 2. Operations 1101 to 1113 of FIG. 11 may be performed, for example, after a welcome message described with reference to FIG. 9 is transmitted. In a description of FIG. 11, reference numerals used in FIG. 5 and FIGS. 6A to 6E will be used.

Hereinafter, operations 1101 to 1106 may indicate operations of sending a message to a chatbot 504 at a UE 501 of a user.

In operation 1101, the UE 501 may generate an SIP message and may send the generated SIP message to a BotAgent 550 of a platform server 502 over an RCS network.

In operation 1102, the BotAgent 550 of the platform server 502 may convert a format of the message into a format suitable for a data network.

In operation 1103, the BotAgent 550 of the platform server 502 may deliver the message to an Exchange 540.

In operation 1104, the Exchange 540 of the platform server 502 may assign the message to a BotServiceQueue (e.g., a BotServiceQueue of FIG. 5).

In operation 1105, a BotService module 510 of the platform server 502 may read a message stored in the BotServiceQueue 570 and may query a BotRegistry 520 of FIG. 5 about a callback URL of a chatbot 504 which is a destination of the message.

In operation 1106, the BotService module 510 of the platform server 502 may send the message to the chatbot 504.

Hereinafter, operations 1107 to 1113 may indicate operations of sending a message to the UE 501 of the user at the chatbot 504.

In operation 1107, the chatbot 504 may generate a message and may send the generated message to the BotService module 510 of the platform server 502 over a data network.

In operation 1108, the BotService module 510 of the platform server 502 may query a UserRegistry (e.g., a UserRegistry 530 of FIG. 5) to obtain information of the user to receive the message, for example, an MSISDN of the UE 501.

In operation 1109, the BotService module 510 of the platform server 502 may deliver the message to the Exchange 540.

In operation 1110, the Exchange 540 of the platform server 502 may assign the message to a TargetQueue 580T.

In operation 1111, the BotAgent 550 of the platform server 502 may read a message stored in the TargetQueue 580T and may convert a format of the message into a format (an SIP message format) suitable for an RCS network 503 of FIG. 5.

In operation 1112, the BotAgent 550 of the platform server 502 may send the message to the UE 501 over the RCS network 503.

In operation 1113, the UE 501 may receive the message over the RCS network 503.

Figure 12:
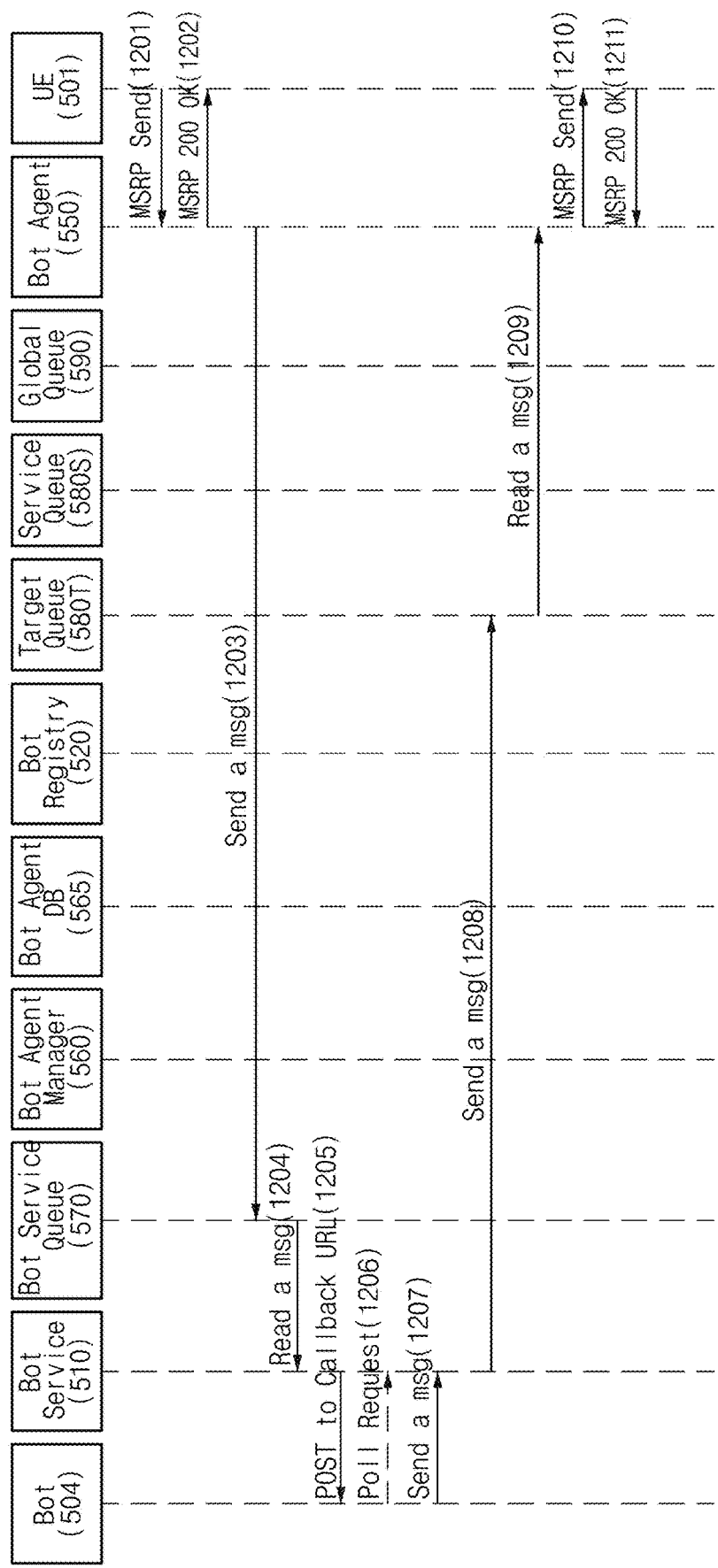
FIG. 12 illustrates operations of a platform server when chatting with a chatbot according to various embodiments.

FIG. 12 illustrates operations of a platform server when chatting with a chatbot according to various embodiments.

Referring to the non-limiting example of FIG. 12, the operation of the platform server when chatting with the chatbot according to some embodiments may include operations 1201 to 1211. Operations 1201 to 1206 may correspond to operations 231 to 238 of FIG. 2 and operations 1101 to 1113 of FIG. 11. Operations 1201 to 1211 of FIG. 12 may be performed, for example, after an MSRP session between a UE 501 and a platform server 502 is initiated after a welcome message described with reference to FIG. 10 is transmitted. In a description of FIG. 12, reference numerals used in FIG. 5 and FIGS. 6A to 6E will be used as appropriate.

Hereinafter, operations 1201 to 1206 may indicate operations of sending a message to a chatbot 504 at the UE 501 of a user.

In operation 1201, since there is a previously generated MSRP session, the UE 501 may send a message to a BotAgent 550 of a platform server 502 without additional message transmission and reception (e.g., see operation 1106 of FIG. 11).

In operation 1202, the UE 501 may receive an OK message ("MSRP 200 OK") from the BotAgent 550 of the platform server 502.

In operation 1203, the BotAgent 550 of the platform server 502 may convert a format of the message and may store the converted message in a BotServiceQueue 570.

In operation 1204, the BotService module 510 of the platform server 502 may read a message stored in the BotServiceQueue 570.

In operation 1205, the BotService module 510 of the platform server 502 may send the message to a callback URL of the chatbot 504. According to various embodiments, in operation 1206, the chatbot 504 may receive the message using a poll request, rather than operation 1205.

Hereinafter, operations 1207 to 1211 may indicate operations of sending a message to the UE 501 of the user at the chatbot 504.

In operation 1207, the chatbot 504 may generate a message and may send the generated message to the BotService module 510 of the platform server 502 over a data network.

In operation 1208, the BotService module 510 of the platform server 502 may store the message in a TargetQueue 580T.

In operation 1209, the BotAgent 550 of the platform server 502 may read the message stored in the TargetQueue 580T and may convert a format of the message into a format (an SIP message format) suitable for an RCS network 503 of FIG. 5.

In operation 1210, the BotAgent 550 of the platform server 502 may send the message to the UE 501 using the previously generated MSRP session.

In operation 1211, the BotAgent 550 of the platform server 502 may receive an OK message ("MSRP 220 OK") from the UE 501.

In at least one embodiment as exemplified in FIG. 12, operations 1201 to 1211 are performed after an MSRP session between the UE 501 and the platform server 502 described with reference to FIG. 10 is initiated. However, embodiments are not limited thereto. For example, before receiving a welcome message, the UE 501 may first send a message for requesting a constant service to the chatbot 504. In this case, the UE 501 may initiate an MSRP session (e.g., an operation 1006 of FIG. 10) with the platform server 502 and may then send the message to the chatbot 504 via the platform server 502 like, for example, operations 1201 to 1206.

According to various embodiments of the present disclosure, message transmission and reception between a chatbot and an electronic device may be performed over an RCS network. The RCS network may provide higher accessibility than an OTT messaging service application. Further, since the RCS network is adopted as an international standard in GSMA, compatibility between carriers may be high. Contrary to providing an OTT-based chatbot service on an IP network, since a chatbot service based on such an RCS network uses a phone number of a user, it may be provided over an existing network which provides an SMS/MMS. Thus, all subscribers connected to a cellular network may substantially become potential customers. In addition, when an RCS network operator agrees to being interoperable with its RCS network, it may provide a worldwide service.

An electronic device 401 according to various embodiments may include a housing, a display 460 configured to be exposed through one surface of the housing, a communication module 490 configured to communicate over a first network 499-1 compliant with a first protocol or a second network 499-2 compliant with a second protocol, a processor 420 configured to be electrically connected with the display 460 and the communication module 490, and a memory 430 configured to be electrically connected with the processor 420 and store a specified application 447. The memory 430 may store instructions, when executed, causing the processor 420 to execute the specified application 447, designate a CP server 404 by interacting with a platform server 402 over the second network 499-2, receive an initial response message generated by the designated CP server 404 over the first network 499-1, and verify a first identifier of the designated CP server 404 based on the first protocol from a source of the initial response message.

According to some embodiments, the memory 430 may further store instructions, when executed, causing the processor 420 to generate a first message formatted under the first protocol and destined to the first identifier of the CP server and transmit the first message to the platform server 402 over the first network 499-1. The platform server 402 may deliver the first message to the designated CP server 404.

According to certain embodiments, the platform server 402 may be configured to convert the first message to be formatted under the second protocol, change a destination of the converted first message to the second identifier of the designated CP server 404 based on the second protocol, and deliver the converted first message to the designated CP server 404 indicated by the second identifier, over the second network.

According to various embodiments, the memory 430 may further store instructions, when executed, causing the processor 420 to receive a second message from the platform server 402 over the first network 499-1. The second message may be generated by the CP server 404 and may include content associated with a context of the first message.

According to some embodiments, the first message may include a natural language (NL).

According to certain embodiments, the memory 430 may further store instructions, when executed, causing the processor 420 to transmit a request message at least in part including a search query associated with the designated CP server 404 to the platform server 402 via the communication module 490 and receive a list of CP servers associated with the search query in response to the request message. The designated CP server 404 may be selected among the CP servers included in the list.

A server 402 according to various embodiments may include a communication module 490 configured to communicate with an electronic device 401 over a first network 499-1 compliant with a first protocol and communicate with a CP server 404 over a second network compliant with a second protocol, a processor 420 configured with be electrically connected with the communication module 490, and a memory 430 configured to be electrically connected with the processor 420 and store a first correspondence relationship between a first identifier of the CP server 404 based on the first protocol and a second identifier of the CP server 404 based on the second protocol. The memory 430 may store instructions, when executed, causing the processor 420 to receive a first message formatted under the first protocol and destined to the first identifier of the CP server 404, from the electronic device 401 over the first network 499-1, convert the first message to be formatted under the second protocol, change a destination of the converted first message to a second identifier of the CP server using the first correspondence relationship stored in the memory 430, and transmit the converted first message to the CP server indicated by the second identifier, over the second network 499-2.

According to some embodiments, the first protocol may include a rich communication suite (RCS).

According to certain embodiments, the first identifier may include a mobile station international subscriber directory number (MSISDN).

According to various embodiments, the second protocol may include an Internet protocol or an HTTPS.

According to some embodiments, the second identifier may include a uniform resource identifier (URI).

According to certain embodiments, the communication module 490 may be configured to further communicate with the electronic device 401 over the second network 499-2. The memory 430 may further store instructions, when executed, causing the processor 420 to, when the CP server 404 is designated based on interacting with the electronic device 401 over the second network 499-2, transmit a notification message to the CP server 404 over the second network 499-2.

According to various embodiments, the memory 430 may further store instructions, when executed, causing the processor 420 to receive an initial response message from the CP server 404 over the second network 499-2 in response to transmitting the notification message, convert the initial response message to be formatted under the first protocol, and transmit the initial response message to the electronic device 401 over the first network 499-1. The first message received from the electronic device 401 may be received after the initial response message is transmitted.

According to some embodiments, the electronic device 401 may be configured to verify the first identifier of the CP server 404 from a source of the received initial response message.

According to certain embodiments, the initial response message may include meta-information for describing a service provided from the CP server 404.

According to various embodiments, the communication module 490 may be configured to further communicate with the electronic device 401 over the second network 499-2. The memory 430 may further store instructions, when executed, causing the processor 420 to, when the CP server 404 is designated based on interacting with the electronic device 401 over the second network 499-2, verify an identifier of the electronic device 401 based on the first protocol, allocate a unique identifier to the electronic device 401, store a second correspondence relationship between the identifier of the electronic device 401 based on the first protocol and the allocated unique identifier in the memory 430, and transmit a notification message including the unique identifier to the CP server 404 over the second network 499-2.

According to some embodiments, the memory 430 may further store instructions, when executed, causing the processor 420 to receive an initial response message destined to the unique identifier from the CP server 404 over the second network 499-2 in response to transmitting the notification message, convert the initial response message to be formatted under the first protocol, change a destination of the initial response message to the identifier of the electronic device 401 based on the first protocol, using the second correspondence relationship stored in the memory 430, and transmit the initial response message to the electronic device 401 over the first network 499-1. The first message received from the electronic device 401 may be received after the initial response message is transmitted.

According to certain embodiments, the electronic device 401 may be configured to set a source of the received initial response message to the first identifier of the CP server 404.

A server 402 according to various embodiments may include a communication module 490 configured with communicate with an electronic device 401 over a first network 499-1 compliant with a first protocol and communicate with a CP server 404 over a second network 499-2 compliant with a second protocol, a processor 420 configured with be electronically connected with the communication module 490, and a memory 430 configured to be electrically connected with the processor 420 and store a second correspondence relationship between an identifier of the electronic device 401 based on the first protocol and a unique identifier allocated to the electronic device 401. The memory 430 may store instructions, when executed, causing the processor 420 to receive a second message formatted under the second protocol and destined to the unique identifier allocated to the electronic device 401, from the CP server 404 over the second network 499-2, convert the second message to be formatted under the first protocol, change a destination of the converted second message to the identifier of the electronic device 401 based on the first protocol using the second correspondence relationship stored in the memory 430, and transmit the converted second message to the electronic device 401 indicated by the identifier of the electronic device 401 based on the first protocol, over the first network 499-1.

According to some embodiments, the CP server 404 may include a natural language processing (NLP) module 444 associated with a service provided from the CP server 404. The second message may include a natural language generated by the NLP module 444.

According to certain embodiments, the unique identifier may indicate the electronic device 401 or may indicate a message exchange thread to which the electronic device 401 belongs.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to" in hardware or software. The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 430).

The term "module" used herein may include a unit, which is implemented with hardware, software, or firmware, and may be interchangeably used with the terms "logic", "logical block", "component", "circuit", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 430) in the form of a program module. The instruction, when executed by a processor (e.g., a processor 420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other sub-elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
    a housing;
    a display configured to be exposed through one surface of the housing;
    a communication module configured to communicate over a rich communication suite (RCS) network compliant with a first protocol or an internet protocol (IP) network compliant with a second protocol;
    a processor electrically connected with the display and the communication module; and
    a memory electrically connected with the processor and configured to store a specified application that is able to interact with a platform server,
    wherein the memory stores instructions that, when executed, cause the processor to:
        execute the specified application;
        designate a content provider (CP) server, from among a plurality of CP servers registered with the platform server, by interacting with the platform server over the IP network via the specified application;
        receive, from the platform server, an initial response message generated by the designated CP server over the RCS network; and
        verify a first identifier of the designated CP server based on the first protocol from a source of the initial response message, wherein the first identifier of the designated CP server indicates an identifier of the designated CP server among the plurality of CP servers.

2. The electronic device of claim 1, wherein the memory further stores instructions that, when executed, cause the processor to:
    generate a first message formatted under the first protocol and destined to the first identifier of the designated CP server; and
    transmit the first message to the platform server over the RCS network,
    wherein the platform server is configured to deliver the first message to the designated CP server.

3. The electronic device of claim 2, wherein the platform server is configured to:
    convert the first message to be formatted under the second protocol;
    change a destination of the converted first message to a second identifier of the designated CP server based on the second protocol; and
    deliver the converted first message to the designated CP server indicated by the second identifier, over the IP network.

4. The electronic device of claim 2, wherein the memory further stores instructions that, when executed, cause the processor to:
    receive a second message from the platform server over the RCS network,
    wherein the second message is generated by the designated CP server and comprises content associated with a context of the first message.

5. The electronic device of claim 1, wherein the memory further stores instructions that, when executed, cause the processor to:
    transmit a request message at least in part including a search query associated with the designated CP server to the platform server via the communication module; and
    receive a list of CP servers associated with the search query in response to the request message,
    wherein the designated CP server is selected among the CP servers included in the list.

6. A server, comprising:
    a communication module configured to communicate with an electronic device over a rich communication suite (RCS) network compliant with a first protocol and communicate with a content provider (CP) server over an internet protocol (IP) network compliant with a second protocol, the CP server being one of a plurality of CP servers registered with the server;
    a processor electrically connected with the communication module; and
    a memory electrically connected with the processor and configured to store a first correspondence relationship between a first identifier of the CP server based on the first protocol and a second identifier of the CP server based on the second protocol,
    wherein the memory stores instructions that, when executed, cause the processor to:
        receive a first message formatted under the first protocol and destined to the first identifier of the CP server, from the electronic device over the RCS network;
        convert the first message to be formatted under the second protocol;
        change a destination of the converted first message to the second identifier of the CP server using the first correspondence relationship stored in the memory; and
        transmit the converted first message to the CP server indicated by the second identifier, over the IP network.

7. The server of claim 6, wherein the first protocol comprises a rich communication suite (RCS).

8. The server of claim 6, wherein the first identifier comprises a mobile station international subscriber directory number (MSISDN).

9. The server of claim 6, wherein the second protocol comprises an Internet protocol.

10. The server of claim 6, wherein the second identifier comprises a uniform resource identifier (URI).

11. The server of claim 6, wherein the communication module is configured to:
    further communicate with the electronic device over the IP network,
    wherein the memory further stores instructions, that when executed, cause the processor to:
        transmit a notification message to the CP server over the IP network when the CP server is designated based on interacting with the electronic device over the IP network.

12. The server of claim 11, wherein the memory further stores instructions, that when executed, cause the processor to:
    receive an initial response message from the CP server over the IP network in response to transmitting the notification message;
    convert the initial response message to be formatted under the first protocol; and
    transmit the initial response message to the electronic device over the RCS network,
    wherein the first message received from the electronic device is received after the initial response message is transmitted.

13. The server of claim 12, wherein the electronic device is configured to:

verify the first identifier of the CP server from a source of the received initial response message.

14. The server of claim 12, wherein the initial response message comprises meta-information for describing a service provided from the CP server.

15. The server of claim 6, wherein the communication module is configured to:
further communicate with the electronic device over the IP network,
wherein the memory further stores instructions, that when executed, cause the processor to:
verify an identifier of the electronic device based on the first protocol when the CP server is designated based on interacting with the electronic device over the IP network;
allocate a unique identifier to the electronic device;
store a second correspondence relationship between the identifier of the electronic device based on the first protocol and the allocated unique identifier in the memory; and
transmit a notification message including the unique identifier to the CP server over the IP network.

16. The server of claim 15, wherein the memory further stores instructions, that when executed, cause the processor to:
receive an initial response message destined to the unique identifier from the CP server over the IP network in response to transmitting the notification message;
convert the initial response message to be formatted under the first protocol;
change a destination of the initial response message to the identifier of the electronic device based on the first protocol, using the second correspondence relationship stored in the memory; and
transmit the initial response message to the electronic device over the RCS network,
wherein the first message received from the electronic device is received after the initial response message is transmitted.

17. The server of claim 16, wherein the electronic device is configured to:
set a source of the received initial response message to the first identifier of the CP server.

18. A server, comprising:
a communication module configured to communicate with an electronic device over a rich communication suite (RCS) network compliant with a first protocol and communicate with a content provider (CP) server over an internet protocol (IP) network compliant with a second protocol;
a processor electronically connected with the communication module; and
a memory electrically connected with the processor and store a second correspondence relationship between an identifier of the electronic device based on the first protocol and a unique identifier allocated to the electronic device,
wherein the memory stores instructions that, when executed, cause the processor to:
receive a second message formatted under the second protocol and destined to the unique identifier allocated to the electronic device, from the CP server over the IP network;
convert the second message to be formatted under the first protocol;
change a destination of the converted second message to the identifier of the electronic device based on the first protocol using the second correspondence relationship stored in the memory; and
transmit the converted second message to the electronic device indicated by the identifier of the electronic device based on the first protocol, over the RCS network.

19. The server of claim 18, wherein the CP server comprises a natural language processing (NLP) module associated with a service provided from the CP server, and
wherein the second message comprises a natural language generated by the NLP module.

20. The server of claim 18, wherein the unique identifier indicates the electronic device or indicates a message exchange thread to which the electronic device belongs.

* * * * *